(12) United States Patent
Mahadevia et al.

(10) Patent No.: US 10,313,367 B2
(45) Date of Patent: Jun. 4, 2019

(54) METHOD AND SYSTEM FOR NETWORK ACCESS CONTROL BASED ON TRAFFIC MONITORING AND VULNERABILITY DETECTION USING PROCESS RELATED INFORMATION

(71) Applicant: Sophos Limited, Abingdon (GB)

(72) Inventors: Jimit Hareshkumar Mahadevia, Ahmedabad (IN); Shalvi D. Dave, Gujarat (IN); Bhushan H. Trivedi, Gujarat (IN)

(73) Assignee: Sophos Limited, Abingdon (GB)

( * ) Notice: Subject to any disclaimer, the term of this patent is extended or adjusted under 35 U.S.C. 154(b) by 234 days.

(21) Appl. No.: 15/527,783

(22) PCT Filed: Dec. 18, 2015

(86) PCT No.: PCT/GB2015/054072
§ 371 (c)(1),
(2) Date: May 18, 2017

(87) PCT Pub. No.: WO2016/097757
PCT Pub. Date: Jun. 23, 2016

(65) Prior Publication Data
US 2017/0339172 A1 Nov. 23, 2017

(30) Foreign Application Priority Data

Dec. 18, 2014 (IN) .......................... 4068/MUM/2014
May 26, 2015 (IN) .......................... 4068/MUM/2014

(51) Int. Cl.
*H04L 29/06* (2006.01)
*G06F 21/55* (2013.01)

(52) U.S. Cl.
CPC ........ *H04L 63/1416* (2013.01); *G06F 21/554* (2013.01); *H04L 63/0263* (2013.01); *H04L 63/1433* (2013.01); *H04L 63/1441* (2013.01)

(58) Field of Classification Search
None
See application file for complete search history.

(56) References Cited

U.S. PATENT DOCUMENTS

2004/0049693 A1  3/2004  Douglas et al.
2009/0320138 A1  12/2009  Keanini et al.
(Continued)

FOREIGN PATENT DOCUMENTS

WO    WO-2016097757    6/2016

OTHER PUBLICATIONS

Curt Yasm: "Prelude as a Hybrid IDS Framework", Jan. 1, 2009 (Jan. 1, 2009), XP055251951, Retrieved from the Internet: URL:https://www.sans.org/reading-room/whitepapers/awareness/prelude-hybrid-ids-framework-33048 (Year: 2009).*

(Continued)

*Primary Examiner* — Andrew J Steinle
(74) *Attorney, Agent, or Firm* — Strategic Patents, P.C.

(57) ABSTRACT

Disclosed are various embodiments of method and system for network access control. The method may involve traffic monitoring and vulnerability detection using process information. The system may analyze the vulnerability as a process malfunctioning where preventive action focuses on process blocking as opposed to host blocking, which can lead to improved performance and productivity of a network. Techniques may use process related information, connection information, and network packet information for network control. The information may be matched against a plurality of signatures to identify and detect a known vulnerability in network activities. On the basis of a match, a (Continued)

verification report may be established. Techniques may further check whether a verification report is applicable to a process associated with a network packet and allow or block the process running on the host based in the report.

17 Claims, 13 Drawing Sheets

(56) References Cited

U.S. PATENT DOCUMENTS

| | | | |
|---|---|---|---|
| 2011/0238855 A1* | 9/2011 | Korsunsky | G06F 21/55 709/231 |
| 2012/0240185 A1* | 9/2012 | Kapoor | H04L 63/1425 726/1 |
| 2014/0013434 A1 | 1/2014 | Ranum et al. | |

OTHER PUBLICATIONS

Yasm, Curt, "Prelude as a Hybrid IDS Framework", Retrieved from the Internet: URL:https://www.sans.org/reading-room/whitepapers/awareness/prelude-hybrid-ids-framework-33048 [retrieved on Feb. 22, 2016] sections 3-5 and 7. Jan. 1, 2009 , 46 pages.

EPO, "PCT Application No. PCT/GB2015/054072 International Search Report and Written Opinion dated Mar. 8, 2016", 15 pages.

WIPO, "PCT Application No. PCT/GB2015/054072 International Preliminary Report on Patentability dated Jun. 29, 2017", 10 pages.

* cited by examiner

| SIGNATURE ID 902 | SIGNATURE NAME 904 | APPLICABLE PROCESS 906 | APPLICABLE PROCESS VERSION 908 |
|---|---|---|---|
| 2017478 | IE MEMORY CORRUPTION VULNERABILITY | INTERNET EXPLORER | 7 TO 9 |
| 100000447 | MOZILLA FIREFOX DOMNodeRemoved ATTACK ATTEMPT | MOZILLA FIREFOX | ANY |
| 2101809 | APACHE CHUNKED-ENCODING WORM ATTEMPT | APACHE | 1.3X |
| 2002993 | RAPID POP3S CONNECTIONS- POSSIBLE BRUTE FORCE ATTACK | NA | NA |
| 7393 | SMTP_AUTH_FAILURE | TELNET | ANY |

*FIG. 9*

| ALERT ID *1002* | ALERT TYPE *1004* | ALERT NAME *1006* | TIMESTAMP *1008* | PROCESS NAME *1010* | PROCESS VERSION *1012* | NETWORK INFORMATION *1014* | APPLICABLE PROCESS *1016* |
|---|---|---|---|---|---|---|---|
| 1 | CONNECTION | CONNECTION | 1/12/2013 10:40:45 | INTERNET EXPLORER | 7X | 10.1.1.1:50000-20.1.1.1:80 | N/A |
| 2 | INTRUSION | IE MEMORY CORRUPTION VULNERABILITY | 1/12/2013 10:40:46 | INTERNET EXPLORER | 7X | 10.1.1.1:50000-20.1.1.1:80 | INTERNET EXPLORER-V6 TO V9 |
| 3 | CONNECTION | CONNECTION | 1/12/2013 10:40:46 | INTERNET EXPLORER | 7X | 10.1.1.1:50001-20.1.1.1:12345 | N/A |
| 4 | INTRUSION | PORT SCAN | 1/12/2013 10:40:47 | INTERNET EXPLORER | 7X | 10.1.1.1:50002-255.255.255.255:25 | INMAP |
| 5 | CONNECTION | CONNECTION | 1/12/2013 10:40:48 | INTERNET EXPLORER | 7X | 10.1.1.1:50003-10.1.1.2:25 | N/A |
| 6 | INTRUSION | PORT SCAN | 1/12/2013 10:40:49 | NMAP | 2X | 10.1.1.3:10000-255.255.255.255:25 | INMAP |
| 7 | CONNECTION | CONNECTION | 1/12/2013 10:40:49 | GOOGLE CHROME | 5X | 10.1.1.4:20000-20.1.1.1:80 | N/A |

*FIG. 10*

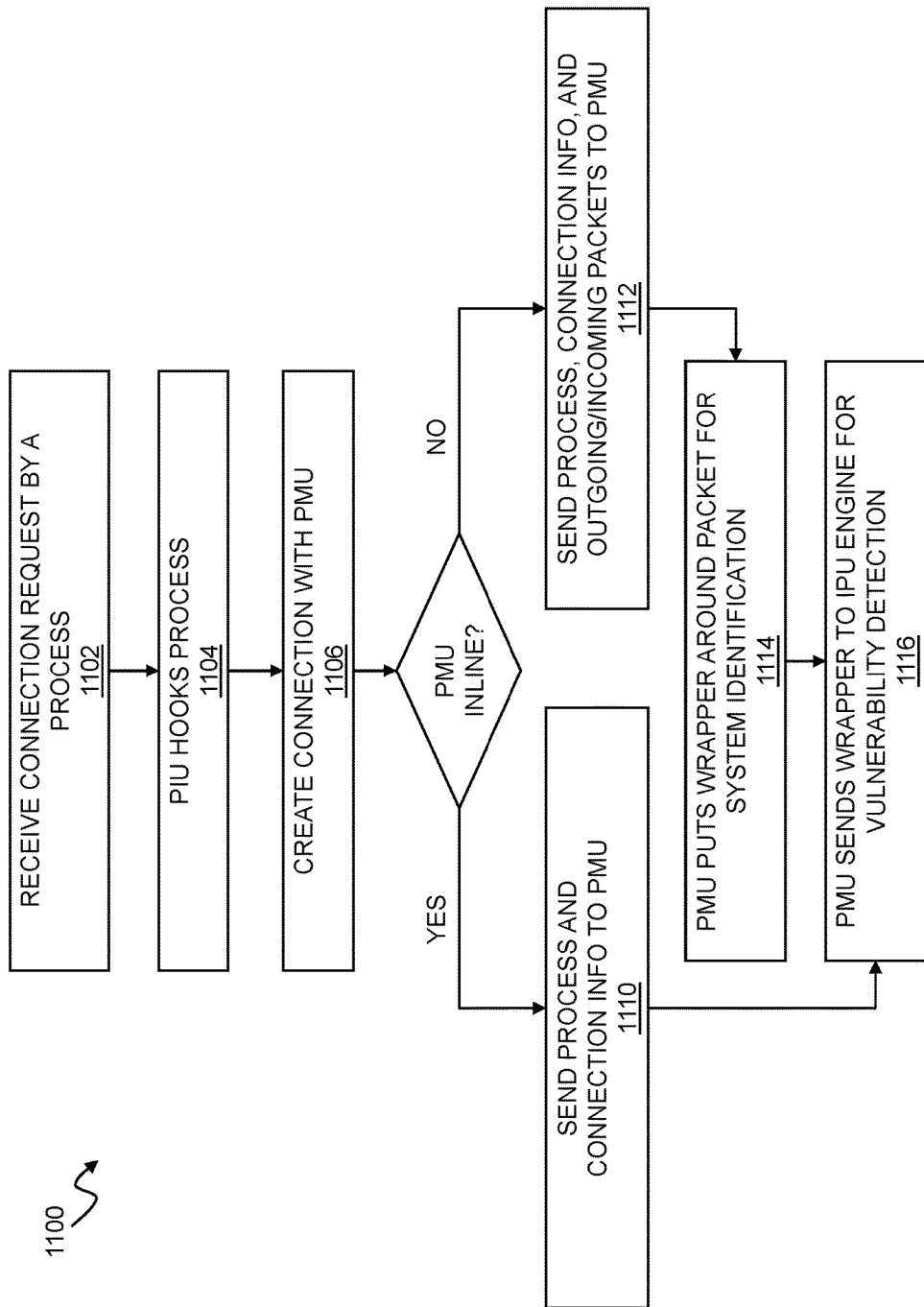

METHOD AND SYSTEM FOR NETWORK ACCESS CONTROL BASED ON TRAFFIC MONITORING AND VULNERABILITY DETECTION USING PROCESS RELATED INFORMATION

RELATED APPLICATIONS

This application is a national stage entry application of International Application No. PCT/GB2015/054072 filed on Dec. 18, 2015, which claims priority to Indian Patent Application No. 4068/MUM/2014 filed on Dec. 18, 2014 and Indian Patent Application No. 4068/MUM/2014 filed on May 26, 2015, where each of the foregoing applications is incorporated herein by reference in its entirety.

TECHNICAL FIELD

This application relates to network security and wireless communication, and more specifically to techniques for network access control based on traffic monitoring and vulnerability detection using process related information.

BACKGROUND

The phenomenal growth of networks poses a burden on security of network resources. Network Admission Control (NAC) is a computer networking solution that uses a set of protocols to define and implement a policy that describes how to secure access to network nodes by devices when they attempt to access the network.

For example, European Pat. Pub. No. EP2164228 A1 includes a "Hierarchical application of security services with a computer network" whereby techniques are described for hierarchical application of security services with a network device. In particular, the network device receives security classification information that maps a security class to one or more computing devices. The security class identifies security capabilities of the computing devices. The network device also receives network traffic associated with the computing device and applies a set of patterns defined by a policy associated with the security class to the network traffic to detect a set of network attacks. Based on the application of the set of patterns, the network device forwards the network traffic. As a result of receiving security classification information, the network device may become aware of the security capabilities of the computing device and only apply those patterns required to augment these detected security capabilities, thereby preventing application of overlapping security services through application of these services in a hierarchical manner. But, it scans the network and collects the network security snapshot which comprises association of the host with installed patches, application, etc. When that particular host creates, sends, or receives network data, tailor made pattern matching is applied for that host. For example, if it is known that only certain applications are installed on that host, then attacks related to those applications are scanned and matched. Thus, this includes scanning of entire network and applies pattern matching for applications installed on that host instead of being specific to an identified vulnerable application.

By way of another example, U.S. Pat. No. 6,816,973 includes a method and system for adaptive network security using intelligent packet analysis. The method comprises monitoring network data traffic. The network data traffic is analyzed to assess network information. A plurality of analysis tasks are prioritized based upon the network information. The analysis tasks are to be performed on the monitored network data traffic in order to identify attacks upon the network. But this creates a network map which composes information regarding different devices, OSs, services installed in the network, etc., and then uses that information to analyze the network packet. Thus, this system is fully dependent on a prior network map.

Existing NAC systems can suffer from at least one of the below mentioned deficiencies.

A periodic scan for host assessment is not run at a high enough frequency due to efficiency reasons, resulting in a possibility that a host starts violation of a policy in between scans. For example, after the host is recognized as healthy, it might change status to unhealthy and the monitor may miss this. It might even change its state back to healthy to avoid detection.

Existing NAC solutions have a tendency of removing the entire host from the network once it is found to be unhealthy. Thus, due to just one vulnerable process, all network traffic of a host may be blocked, which can have a practical impact on overall productivity. This behavior also can be used to initiate a denial of a service attack on that host.

Existing NAC solutions may be dependent on a prior network map which makes them stringent.

Existing NAC solutions may apply pattern matching for a plurality of applications installed on that host instead of being specific to identified vulnerable applications which makes them more time consuming and costly.

There is a need for an improved NAC that can operate in an efficient, controlled, and secure manner.

SUMMARY

Disclosed are various embodiments of method and system for network access control (NAC). Embodiments may attempt to unify endpoint security technology (such as antivirus, host intrusion prevention, and vulnerability assessment), user or system authentication, and network security enforcement. Embodiments may integrate an automatic remediation process (e.g., fixing non-compliant nodes before allowing access to network systems), for example, allowing the network infrastructure such as routers, switches, and firewalls to work together with back office servers and end user computing equipment to ensure the information system is operating securely before interoperability is allowed.

In general, in one aspect, a system for network access control based on traffic monitoring and vulnerability detection using process related information includes a plurality of devices. The devices may receive at least one connection request from a process running on a host. One or more of the plurality of devices may include a process intercepting unit. The process intercepting unit may be configured for determining process related information and forwarding process related information. The process intercepting unit may be configured for determining connection information and forwarding connection information. The process intercepting unit may be configured for determining network packet information and forwarding network packet information.

The system may include a pattern matching unit that is configured for receiving the information from the process intercepting unit and forwarding the information. The system may include an intrusion prevention unit configured for receiving information from the pattern matching unit. The intrusion prevention unit may include a processing unit and a data store. The data store may include a plurality of signatures defining a set of rules to detect attacks or intrusive activities on a network that can occur through the process. The plurality of signatures may be prepared based on information relating to processes. The intrusion prevention unit may be further configured to verify the information from the pattern matching unit against the plurality of signatures stored in the database to identify and detect a known vulnerability in network activities. The intrusion prevention unit may be configured to establish a verification report based on the known vulnerability, and send the verification report to the pattern matching unit.

The pattern matching unit may be further configured to receive the verification report from the intrusion prevention unit, verify whether the verification report is applicable to the process associated with network packet, and send an authorization decision to the process intercepting unit regarding allowing continuing or blocking of the connection request from the process running on the host.

In some implementations, process related information may include a process name and a process version. In some implementations, the signature includes a unique signature identification code. In some implementations, the verification report includes a unique signature identification code. In some implementations, the pattern matching unit includes an application process information database containing unique a signature identification code, a signature name, an applicable process name, and an applicable process version. In some implementations, the pattern matching unit is further configured for matching the signature identification code in the verification report with the signature identification code stored in the application process information database.

In some implementations, the process intercepting unit is further configured for disallowing only the process and not the host for communication if the authorization decision indicates a matching of the signature identification code mentioned in the verification report with the signature identification code stored in an application process information database.

In some implementations, the pattern matching unit is deployed in an inline mode, such that the pattern matching unit can monitor network connections and network traffic. In some such implementations, the pattern matching unit can monitor incoming and outgoing packets.

In some implementations, the pattern matching unit is deployed in an out of band mode. In some such implementations, the pattern matching unit may receive connection and/or network traffic information (e.g., incoming and outgoing packets) from the process intercepting unit and/or from another network device.

In general, in some implementations, a method for network access control based on traffic monitoring and vulnerability detection may use process related information.

The method may include receiving, by a device, at least one connection request from a process running on a host. The method may include extracting, by a process intercepting unit of the device, process related information. The method may include forwarding, by the process intercepting unit to a pattern matching unit, information including one or more of process related information, connection information, and network packet information. The method may include receiving, by the pattern matching unit, the information from the process intercepting unit and forwarding the to an intrusion prevention unit. The method may include receiving, by the intrusion prevention unit, information from the pattern matching unit. The method may include verifying, by the intrusion prevention unit, the information against a plurality of signatures stored in a database of the intrusion prevention unit to identify and detect a known vulnerability in network activity. The method may include establishing, by the intrusion prevention unit, a verification report based on verification of the information against the plurality of signatures. The method may include sending, by the intrusion prevention unit, the verification report to the pattern matching unit. The method may include receiving, by the pattern matching unit, the verification report from the intrusion prevention unit. The method may include verifying, by the pattern matching unit, whether the verification report is applicable to the process associated with a network packet. The method may include sending, by the pattern matching unit, an authorization decision to the process intercepting unit regarding continuing or blocking of the connection request from the process running on the host.

In some implementations, the process related information includes a process name and a process version. In some implementations, the signature defines a set of rules to detect attacks or intrusive activities on a network that can occur through the process, and a signature is prepared based on information relating to the process.

In some implementations, the signature includes a unique signature identification code. In some implementations, the verification report includes a unique signature identification code. In some implementations, the pattern matching unit includes an application process information database containing a unique signature identification code, a signature name, an applicable process name, and an applicable process version. In some implementations, the method includes matching, by the pattern matching unit, the signature identification code mentioned in the verification report with the signature identification code stored in the application process information database.

In some implementations, the method includes disallowance, by the process intercepting unit, of the process and not the host for communication, if an authorization decision indicates matching of the signature identification code mentioned in the verification report with the signature identification code stored in the application process information database. In some implementations, the pattern matching unit is deployed in an inline mode. In some implementations, the pattern matching unit is deployed in an out of band mode.

Some implementations may control access to a network with policies, including pre-admission endpoint security policy checks and post-admission controls over where users and devices can go on a network and what they can do. Some implementations may a use set of technologies and defined processes, to control access to the network allowing only authorized and compliant host to access and operate on a network. Some implementations may use endpoint assessment capabilities to determine the security posture of connecting devices. Some implementations may be responsible for controlling the devices remotely for security operations. This process may be dynamic in the sense that it does not only happen during the initial attachment of the node to the network, it checks periodically to make sure the status of the host is what it should be (decided by the administrator). Controlling mechanisms may include quarantining or even removing the misbehaving process of the remote-controlled host. Some implementations may provide a policy implementation, which is achieved using host assessment as well as validation and enforcement of restriction. Host assessment may determine the state of a host and the kind of access it should receive. The state of a host may include a current version of operating system, an anti-virus signature, a status of a firewall, installed software or patches, etc. Some implementations may operate in at least two modes, where the first mode utilizes basic facilities provided by the operating system of the host to report back and the second mode utilizes special processes known as agents to shoulder the responsibility of reporting. This information may be relayed to a centralized controller using Agent-based or Agent-less NAC techniques depending on the mode chosen by the administrator. Agent-based NAC may use operating system independent agents to retrieve host information. Agent-less NAC may use an operating system's management interface to query the operating system and receive information about the host (e.g., a snapshot), which may be collected in the form of checkpoints. For each checkpoint, a controller may categorize a host as healthy or unhealthy. The unhealthy hosts should be restricted.

For example, virtual local area network (VLAN) steering switches may be instructed to divert traffic to and from such unhealthy hosts or processes residing on such hosts. It may be possible to manage these switches remotely and usually from a central place it is possible to monitor and control the entire network. The remote controlling of this switch may be done by a few methods. One is to use simple network management protocol (SNMP) commands when an SNMP client is running on the host under consideration. Another option is to use remote login methods like a secure shell (SSH) or Telnet to send commands to the target host.

In general, in some implementations, a method may include traffic monitoring and vulnerability detection using process information. In general, in some implementations, a system may analyze a vulnerability as a process malfunction with preventive action focusing on process blocking rather than host blocking, which can lead to improved performance and productivity of a network. Techniques may use process related information, connection information, and network packet information for network control. The information may be matched against a plurality of signatures to identify and detect a known vulnerability in network activities. On the basis of a match, a verification report may be established. Techniques may further check whether a verification report is applicable to a process associated with a network packet and allow or block the process running on the host based in the report.

Implementations may provide a mechanism for NAC based on traffic monitoring and vulnerability detection using process information, which can help to ensure the security of network resources against malicious intent. Implementations may also or instead provide NAC based on traffic monitoring and vulnerability detection using process information, which monitors each host under consideration, identifies vulnerable processes if they are running on monitored hosts, and blocks those particular vulnerable processes instead of blocking the entire host from acquiring network resources. Implementations may also or instead provide NAC based on traffic monitoring and vulnerability detection using process information, which enables an efficient way of controlling network access and can focus on real runtime alert information retrieval and remediation.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 9 shows information included in an application process information data store of a pattern matching unit in an implementation.

FIG. 10 shows information included in an alert store data store of a pattern matching unit in an implementation.

FIGS. 11-13 depict flowcharts of an implementation of a method for network access control.

DETAILED DESCRIPTION

Figure 1:
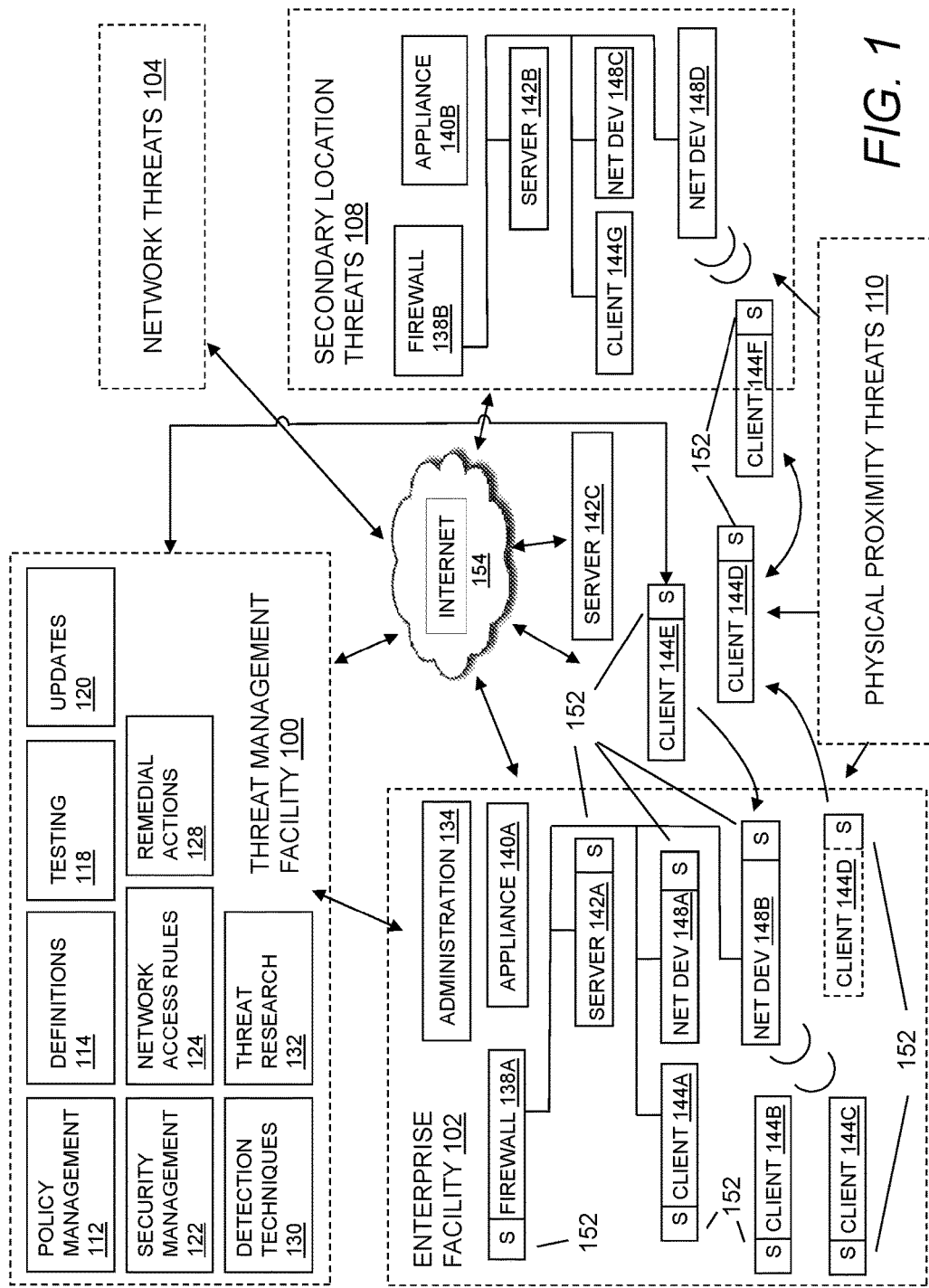
FIG. 1 illustrates an implementation of an environment for threat management.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "above," "below," and the like, are words of convenience and are not to be construed as limiting terms unless expressly state otherwise.

While techniques described herein may emphasize certain threat management techniques such as the detection (and, in some instances remediation) of advanced persistent threats (APTs) that can be manually and remotely controlled through a remote command and control infrastructure, it will be appreciated that the disclosed systems and methods are more generally applicable in a wide variety of threat management contexts including malware, viruses, and the like that might not be classified as APTs. For example, the disclosed systems and methods are applicable to targeted attacks, e.g., attacks that are directly controlled by an adversary or that are run remotely by semiautonomous or fully autonomous software with the intention being to breach, attack, penetrate, etc., the security put in place to protect assets and maintain the integrity of systems protected. Thus, references to APTs or other threats throughout this document should be understood to also refer to any threat or other malware or the like that might be usefully remediated using the techniques described herein. More generally, the scope of this disclosure is not limited by the context and examples provided herein, but is intended to include any other adaptations or uses of the disclosed techniques for enterprise security that might be apparent to one of ordinary skill in the art.

An environment for threat management where the devices, systems, and methods discussed herein may be utilized will now be described.

FIG. 1 illustrates an environment for threat management. Specifically, FIG. 1 depicts a block diagram of a threat management system providing protection to an enterprise against a plurality of threats. One aspect relates to corporate policy management and implementation through a unified threat management facility 100. As will be explained in more detail below, a threat management facility 100 may be used to protect computer assets from many threats, both computer-generated threats and user-generated threats. The threat management facility 100 may be multi-dimensional in that it may be designed to protect corporate assets from a variety of threats and it may be adapted to learn about threats in one dimension (e.g. worm detection) and apply the knowledge in another dimension (e.g. spam detection). Policy management is one of the dimensions for which the threat management facility can provide a control capability. A corporation or other entity may institute a policy that prevents certain people (e.g. employees, groups of employees, types of employees, guest of the corporation, etc.) from accessing certain types of computer programs. For example, the corporation may elect to prevent its accounting department from using a particular version of an instant messaging service or all such services. In this example, the policy management facility 112 may be used to update the policies of all corporate computing assets with a proper policy control facility or it may update a select few. By using the threat management facility 100 to facilitate the setting, updating and control of such policies the corporation only needs to be concerned with keeping the threat management facility 100 up to date on such policies. The threat management facility 100 can take care of updating all of the other corporate computing assets.

It should be understood that the threat management facility 100 may provide multiple services, and policy management may be offered as one of the services. We will now turn to a description of certain capabilities and components of the threat management system 100.

Over recent years, malware has become a major problem across the Internet 154. From both technical and user perspectives, the categorization of a specific threat type, whether as virus, worm, spam, phishing exploration, spyware, adware, or the like, is becoming reduced in significance. The threat, no matter how it is categorized, may need to be stopped at various points of a networked computing environment, such as one of an enterprise facility 102, including at least one or more laptops, desktops, servers, gateways, communication ports, handheld or mobile devices, firewalls, and the like. Similarly, there may be less and less benefit to the user in having different solutions for known and unknown threats. As such, a consolidated threat management facility 100 may need to apply a similar set of technologies and capabilities for all threats. In certain embodiments, the threat management facility 100 may provide a single agent on the desktop, and a single scan of any suspect file. This approach may eliminate the inevitable overlaps and gaps in protection caused by treating viruses and spyware as separate problems, while simultaneously simplifying administration and minimizing desktop load. As the number and range of types of threats has increased, so may have the level of connectivity available to all IT users. This may have led to a rapid increase in the speed at which threats may move. Today, an unprotected PC connected to the Internet 154 may be infected quickly (perhaps within 10 minutes) which may require acceleration for the delivery of threat protection. Where once monthly updates may have been sufficient, the threat management facility 100 may automatically and seamlessly update its product set against spam and virus threats quickly, for instance, every five minutes, every minute, continuously, or the like. Analysis and testing may be increasingly automated, and also may be performed more frequently; for instance, it may be completed in 15 minutes, and may do so without compromising quality. The threat management facility 100 may also extend techniques that may have been developed for virus and malware protection, and provide them to enterprise facility 102 network administrators to better control their environments. In addition to stopping malicious code, the threat management facility 100 may provide policy management that may be able to control legitimate applications, such as VoIP, instant messaging, peer-to-peer file-sharing, and the like, that may undermine productivity and network performance within the enterprise facility 102.

The threat management facility 100 may provide an enterprise facility 102 protection from computer-based malware, including viruses, spyware, adware, Trojans, intrusion, spam, policy abuse, uncontrolled access, and the like, where the enterprise facility 102 may be any entity with a networked computer-based infrastructure. In an embodiment, FIG. 1 may depict a block diagram of the threat management facility 100 providing protection to an enterprise against a plurality of threats. The enterprise facility 102 may be corporate, commercial, educational, governmental, or the like, and the enterprise facility's 102 computer network may be distributed amongst a plurality of facilities, and in a plurality of geographical locations, and may include administration 134, a firewall 138A, an appliance 140A, server 142A, network devices 148A-B, clients 144A-D, such as protected by computer security facilities 152, and the like. It will be understood that any reference herein to client facilities may include the clients 144A-D shown in FIG. 1 and vice-versa. The threat management facility 100 may include a plurality of functions, such as security management facility 122, policy management facility 112, update facility 120, definitions facility 114, network access rules facility 124, remedial action facility 128, detection techniques facility 130, testing facility 118, threat research facility 132, and the like. In embodiments, the threat protection provided by the threat management facility 100 may extend beyond the network boundaries of the enterprise facility 102 to include clients 144D (or client facilities) that have moved into network connectivity not directly associated or controlled by the enterprise facility 102. Threats to client facilities may come from a plurality of sources, such as from network threats 104, physical proximity threats 110, secondary location threats 108, and the like. Clients 144A-D may be protected from threats even when the client 144A-D is not located in association with the enterprise 102, such as when a client 144E-F moves in and out of the enterprise facility 102, for example when interfacing with an unprotected server 142C through the Internet 154, when a client 144F is moving into a secondary location threat 108 such as interfacing with components 140B, 142B, 148C, 148D that are not protected, and the like. In embodiments, the threat management facility 100 may provide an enterprise facility 102 protection from a plurality of threats to multiplatform computer resources in a plurality of locations and network configurations, with an integrated system approach.

In embodiments, the threat management facility 100 may be provided as a stand-alone solution. In other embodiments, the threat management facility 100 may be integrated into a third-party product. An application programming interface (e.g. a source code interface) may be provided such that the threat management facility 100 may be integrated. For instance, the threat management facility 100 may be stand-alone in that it provides direct threat protection to an enterprise or computer resource, where protection is subscribed to directly 100. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may include a plurality of elements that provide protection from malware to enterprise facility 102 computer resources, including endpoint security and control, email security and control, web security and control, reputation-based filtering, control of unauthorized users, control of guest and non-compliant computers, and the like. The security management facility 122 may be a software application that may provide malicious code and malicious application protection to a client facility computing resource. The security management facility 122 may have the ability to scan the client facility files for malicious code, remove or quarantine certain applications and files, prevent certain actions, perform remedial actions and perform other security measures. In embodiments, scanning the client facility may include scanning some or all of the files stored to the client facility on a periodic basis, scanning an application when the application is executed, scanning files as the files are transmitted to or from the client facility, or the like. The scanning of the applications and files may be performed to detect known malicious code or known unwanted applications. In an embodiment, new malicious code and unwanted applications may be continually developed and distributed, and updates to the known code database may be provided on a periodic basis, on a demand basis, on an alert basis, or the like.

In an embodiment, the security management facility 122 may provide for email security and control, where security management may help to eliminate spam, viruses, spyware and phishing, control of email content, and the like. The security management facility's 122 email security and control may protect against inbound and outbound threats, protect email infrastructure, prevent data leakage, provide spam filtering, and the like. In an embodiment, security management facility 122 may provide for web security and control, where security management may help to detect or block viruses, spyware, malware, unwanted applications, help control web browsing, and the like, which may provide comprehensive web access control enabling safe, productive web browsing. Web security and control may provide Internet use policies, reporting on suspect devices, security and content filtering, active monitoring of network traffic, URI filtering, and the like. In an embodiment, the security management facility 122 may provide for network access control, which may provide control over network connections. Network control may stop unauthorized, guest, or non-compliant systems from accessing networks, and may control network traffic that may not be bypassed from the client level. In addition, network access control may control access to virtual private networks (VPN), where VPNs may be a communications network tunneled through another network, establishing a logical connection acting as a virtual network. In embodiments, a VPN may be treated in the same manner as a physical network.

In an embodiment, the security management facility 122 may provide for host intrusion prevention through behavioral based protection, which may guard against unknown threats by analyzing behavior before software code executes. Behavioral based protection may monitor code when it runs and intervene if the code is deemed to be suspicious or malicious. Advantages of behavioral based protection over runtime protection may include code being prevented from running. Whereas runtime protection may only interrupt code that has already partly executed, behavioral protection can identify malicious code at the gateway or on the file servers and delete the code before it can reach end-point computers and the like.

In an embodiment, the security management facility 122 may provide for reputation filtering, which may target or identify sources of known malware. For instance, reputation filtering may include lists of URIs of known sources of malware or known suspicious IP addresses, or domains, say for spam, that when detected may invoke an action by the threat management facility 100, such as dropping them immediately. By dropping the source before any interaction can initiate, potential threat sources may be thwarted before any exchange of data can be made.

In embodiments, information may be sent from the enterprise back to a third party, a vendor, or the like, which may lead to improved performance of the threat management facility 100. For example, the types, times, and number of virus interactions that a client experiences may provide useful information for the preventions of future virus threats. This type of feedback may be useful for any aspect of threat detection. Feedback of information may also be associated with behaviors of individuals within the enterprise, such as being associated with most common violations of policy, network access, unauthorized application loading, unauthorized external device use, and the like. In embodiments, this type of information feedback may enable the evaluation or profiling of client actions that are violations of policy that may provide a predictive model for the improvement of enterprise policies.

In an embodiment, the security management facility 122 may provide for the overall security of the enterprise facility 102 network or set of enterprise facility 102 networks, may provide updates of malicious code information to the enterprise facility 102 network, and associated client facilities. The updates may include a planned update, an update in reaction to a threat notice, an update in reaction to a request for an update, an update based on a search of known malicious code information, or the like. The administration facility 134 may provide control over the security management facility 122 when updates are performed. The updates may be automatically transmitted without an administration facility's 134 direct control, manually transmitted by the administration facility 134, or the like. The security management facility 122 may include the management of receiving malicious code descriptions from a provider, distribution of malicious code descriptions to enterprise facility 102 networks, distribution of malicious code descriptions to client facilities, or the like. In an embodiment, the management of malicious code information may be provided to the enterprise facility's 102 network, where the enterprise facility's 102 network may provide the malicious code information through the enterprise facility's 102 network distribution system.

The threat management facility 100 may provide a policy management facility 112 that may be able to block non-malicious applications, such as VoIP, instant messaging, peer-to-peer file-sharing, and the like, that may undermine productivity and network performance within the enterprise facility 102. The policy management facility 112 may be a set of rules or policies that may indicate enterprise facility 102 access permissions for the client facility, such as access permissions associated with the network, applications, external computer devices, and the like. The policy management facility 112 may include a database, a text file, a combination of databases and text files, or the like. In an embodiment, a policy database may be a block list, a black list, an allowed list, a white list, or the like that may provide a list of enterprise facility 102 external network locations/applications that may or may not be accessed by the client facility. The policy management facility 112 may include rules that may be interpreted with respect to an enterprise facility 102 network access request to determine if the request should be allowed. The rules may provide a generic rule for the type of access that may be granted. The rules may be related to the policies of an enterprise facility 102 for access rights for the enterprise facility's 102 client facility. For example, there may be a rule that does not permit access to sporting websites. When a website is requested by the client facility, a security facility may access the rules within a policy facility to determine if the requested access is related to a sporting website. In an embodiment, the security facility may analyze the requested website to determine if the website matches with any of the policy facility rules.

The policy management facility 112 may be similar to the security management facility 122 but with the addition of enterprise facility 102 wide access rules and policies that may be distributed to maintain control of client facility access to enterprise facility 102 network resources. The policies may be defined for application type, subset of application capabilities, organization hierarchy, computer facility type, user type, network location, time of day, connection type, or the like. Policies may be maintained by the administration facility 134, through the threat management facility 100, in association with a third party, or the like. For example, a policy may restrict instant messaging (IM) activity to only support personnel for communicating with customers. This may allow communication for departments requiring access, but may maintain the network bandwidth for other activities by restricting the use of IM to only the personnel that need access to IM in support of the enterprise facility 102. In an embodiment, the policy management facility 112 may be a stand-alone application, may be part of the network server facility 142, may be part of the enterprise facility 102 network, may be part of the client facility, or the like.

In embodiments, the threat management facility 100 may provide configuration management, which may be similar to policy management, but may specifically examine the configuration set of applications, operating systems, hardware, and the like, and manage changes to their configurations. Assessment of a configuration may be made against a standard configuration policy, detection of configuration changes, remediation of improper configuration, application of new configurations, and the like. An enterprise may keep a set of standard configuration rules and policies which may represent the desired state of the device. For example, a client firewall may be running and installed, but in the disabled state, where remediation may be to enable the firewall. In another example, the enterprise may set a rule that disallows the use of USB disks, and sends a configuration change to all clients, which turns off USB drive access via a registry.

In embodiments, the threat management facility 100 may also provide for the removal of applications that may interfere with the operation of the threat management facility 100, such as competitor products that may also be attempting similar threat management functions. The removal of such products may be initiated automatically whenever such products are detected. In the case where such applications are services which are provided indirectly through a third-party product, the application may be suspended until action is taken to remove or disable the third-party product's protection facility.

Threat management against a sometimes quickly evolving malware environment may require timely updates, and thus an update management facility 120 may be provided by the threat management facility 100. In addition, a policy management facility 112 may also require update management (e.g., as provided by the update facility 120 herein described). The update management for the security facility 122 and policy management facility 112 may be provided directly by the threat management facility 100, such as by a hosted system or in conjunction with the administration facility 134. In embodiments, the threat management facility 100 may provide for patch management, where a patch may be an update to an operating system, an application, a system tool, or the like, where one of the reasons for the patch is to reduce vulnerability to threats.

In embodiments, the security facility 122 and policy management facility 112 may push information to the enterprise facility 102 network and/or client facility, the enterprise facility 102 network and/or client facility may pull information from the security facility 122 and policy management facility 112 network server facilities 142, there may be a combination of pushing and pulling of information between the security facility 122 and the policy management facility 112 network servers 142, enterprise facility 102 network, and client facilities, or the like. For example, the enterprise facility 102 network and/or client facility may pull information from the security facility 122 and policy management facility 112 network server facility 142 may request the information using the security facility 122 and policy management facility 112 update module; the request may be based on a certain time period, by a certain time, by a date, on demand, or the like. In another example, the security facility 122 and policy management facility 112 network servers 142 may push the information to the enterprise facility's 102 network and/or client facility by providing notification that there are updates available for download and then transmitting the information. The combination of the security management 122 network server facility 142 and security update module may function substantially the same as the policy management facility 112 network server and policy update module by providing information to the enterprise facility 102 network and the client facility in a push or pull method. In an embodiment, the policy management facility 112 and the security facility 122 management update modules may work in concert to provide information to the enterprise facility's 102 network and/or client facility for control of application execution. In an embodiment, the policy update module and security update module may be combined into a single update module.

As threats are identified and characterized, the threat management facility 100 may create definition updates that may be used to allow the threat management facility 100 to detect and remediate the latest malicious software, unwanted applications, configuration and policy changes, and the like. The threat definition facility 114 may contain threat identification updates, also referred to as definition files. A definition file may be a virus identity file that may include definitions of known or potential malicious code. The virus identity (IDE) definition files may provide information that may identify malicious code within files, applications, or the like. The definition files may be accessed by security management facility 122 when scanning files or applications within the client facility for the determination of malicious code that may be within the file or application. The definition files may contain a number of commands, definitions, or instructions, to be parsed and acted upon, or the like. In embodiments, the client facility may be updated with new definition files periodically to provide the client facility with the most recent malicious code definitions; the updating may be performed on a set time period, may be updated on demand from the client facility, may be updated on demand from the network, may be updated on a received malicious code alert, or the like. In an embodiment, the client facility may request an update to the definition files from an update facility 120 within the network, may request updated definition files from a computing facility external to the network, updated definition files may be provided to the client facility 114 from within the network, definition files may be provided to the client facility from an external computing facility from an external network, or the like.

In an embodiment, a definition management facility 114 may provide for the timely updates of definition files information to the network, client facilities, and the like. New and altered malicious code and malicious applications may be continually created and distributed to networks worldwide. The definition files that maintain the definitions of the malicious code and malicious application information for the protection of the networks and client facilities may need continual updating to provide continual defense of the network and client facility from the malicious code and malicious applications. The definition files management may provide for automatic and manual methods of updating the definition files. In embodiments, the network may receive definition files and distribute the definition files to the network client facilities, the client facilities may receive the definition files directly, or the network and client facilities may both receive the definition files, or the like. In an embodiment, the definition files may be updated on a fixed periodic basis, on demand by the network and/or the client facility, as a result of an alert of a new malicious code or malicious application, or the like. In an embodiment, the definition files may be released as a supplemental file to an existing definition files to provide for rapid updating of the definition files.

In a similar manner, the security management facility 122 may be used to scan an outgoing file and verify that the outgoing file is permitted to be transmitted per the enterprise facility 102 rules and policies. By checking outgoing files, the security management facility 122 may be able discover malicious code infected files that were not detected as incoming files as a result of the client facility having been updated with either new definition files or policy management facility 112 information. The definition files may discover the malicious code infected file by having received updates of developing malicious code from the administration facility 134, updates from a definition files provider, or the like. The policy management facility 112 may discover the malicious code infected file by having received new updates from the administration facility 134, from a rules provider, or the like.

The threat management facility 100 may provide for a way to control access to the enterprise facility 102 networks. For instance, the enterprise facility 102 may want to restrict access to certain applications, networks, files, printers, servers, databases, or the like. In addition, the enterprise facility 102 may want to restrict user access under certain conditions, such as the user's location, usage history, need to know, job position, connection type, time of day, method of authentication, client-system configuration, or the like. Network access rules may be developed by the enterprise facility 102, or pre-packaged by a supplier, and managed by the threat management facility 100 in conjunction with the administration facility 134. Network access rules and control may be responsible for determining if a client facility application should be granted access to a requested network location. The network location may be on the same network as the facility or may be on another network. In an embodiment, the network access control may verify access rights for client facilities from within the network or may verify access rights of computer facilities from external networks. When network access for a client facility is denied, the network access control may send an information file to the client facility, the information file may contain data or commands that may provide instructions for the remedial action facility 128. The information sent by the network access facility 124 control may be a data file. The data file may contain a number of commands, definitions, instructions, or the like to be parsed and acted upon through the remedial action facility 128, or the like. The information sent by the network access facility 124 control may be a command or command file that the remedial action facility 128 may access and take action upon.

In an embodiment, the network access rules 124 may provide an information store to be accessed by the network access control. The network access rules facility 124 may include databases such as a block list, a black list, an allowed list, a white list, an unacceptable network site database, an acceptable network site database, a network site reputation database, or the like of network access locations that may or may not be accessed by the client facility. Additionally, the network access rules facility 124 may incorporate rule evaluation; the rule evaluation may parse network access requests and apply the parsed information to network access rules. The network access rule facility 124 may have a generic set of rules that may be in support of an enterprise facility's 102 network access policies, such as denying access to certain types of websites, controlling instant messenger accesses, or the like. Rule evaluation may include regular expression rule evaluation, or other rule evaluation method for interpreting the network access request and comparing the interpretation to the established rules for network access. In an embodiment, the network access rules facility 124 may receive a rules evaluation request from the network access control and may return the rules evaluation to the network access control.

The network access rule facility may include or may communicate with an intrusion prevention unit, a pattern matching unit and/or a process intercepting unit, which are described further below.

Similar to the threat definitions facility 114, the network access rule facility 124 may provide updated rules and policies to the enterprise facility 102. The network access rules facility 124 may be maintained by the network administration facility 134, using network access rules facility 124 management. In an embodiment, the network administration facility 134 may be able to maintain a set of access rules manually by adding rules, changing rules, deleting rules, or the like. Additionally, the administration facility 134 may be able to retrieve predefined rule sets from a provider that may provide a set of rules to be applied to an entire enterprise facility 102. The network administration facility 134 may be able to modify the predefined rules as needed for a particular enterprise facility 102 using the network access rules management facility 124.

When a threat or policy violation is detected by the threat management facility 100, the threat management facility 100 may provide for a remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, record interactions for subsequent evaluation, or the like. Remedial action may be associated with an application that responds to information that a client facility network access request has been denied. In an embodiment, when the data file is received, remedial action may parse the data file, interpret the various aspects of the data file, and act on the parsed data file information to determine actions to be taken on an application requesting access to a denied network location. In an embodiment, when the data file is received, remedial action may access the threat definitions to parse the data file and determine an action to be taken on an application requesting access to a denied network location. In an embodiment, the information received from the facility may be a command or a command file. The remedial action facility may carry out any commands that are received or parsed from a data file from the facility without performing any interpretation of the commands. In an embodiment, the remedial action facility may interact with the received information and may perform various actions on a client requesting access to a denied network location. The action may be one or more of continuing to block all requests to a denied network location, a malicious code scan on the application, a malicious code scan on the client facility, quarantine of the application, terminating the application, isolation of the application, isolation of the client facility to a location within the network that restricts network access, blocking a network access port from a client facility, reporting the application to an administration facility 134, or the like.

Remedial action may be provided as a result of a detection of a threat or violation. The detection techniques facility 130 may include monitoring the enterprise facility 102 network or end-point devices, such as by monitoring streaming data through the gateway, across the network, through routers and hubs, and the like. The detection techniques facility 130 may include monitoring activity and stored files on computing facilities, such as on server facilities 142, desktop computers, laptop computers, other mobile computing devices, and the like. Detection techniques, such as scanning a computer's stored files, may provide the capability of checking files for stored threats, either in the active or passive state. Detection techniques, such as streaming file management, may provide the capability of checking files received at the network, gateway facility, client facility, and the like. This may provide the capability of not allowing a streaming file or portions of the streaming file containing malicious code from entering the client facility, gateway facility, or network. In an embodiment, the streaming file may be broken into blocks of information, and a plurality of virus identities may be used to check each of the blocks of information for malicious code. In an embodiment, any blocks that are not determined to be clear of malicious code may not be delivered to the client facility, gateway facility, or network.

Verifying that the threat management facility 100 is detecting threats and violations to established policy, may require the ability to test the system, either at the system level or for a particular computing component. The testing facility 118 may allow the administration facility 134 to coordinate the testing of the security configurations of client facility computing facilities on a network. The administration facility 134 may be able to send test files to a set of client facility computing facilities to test the ability of the client facility to determine acceptability of the test file. After the test file has been transmitted, a recording facility may record the actions taken by the client facility in reaction to the test file. The recording facility may aggregate the testing information from the client facility and report the testing information to the administration facility 134. The administration facility 134 may be able to determine the level of preparedness of the client facility computing facilities by the reported information. Remedial action may be taken for any of the client facility computing facilities as determined by the administration facility 134; remedial action may be taken by the administration facility 134 or by the user of the client facility.

The threat research facility 132 may provide a continuously ongoing effort to maintain the threat protection capabilities of the threat management facility 100 in light of continuous generation of new or evolved forms of malware. Threat research may include researchers and analysts working on known and emerging malware, such as viruses, rootkits, a spyware, as well as other computer threats such as phishing, spam, scams, and the like. In embodiments, through threat research, the threat management facility 100 may be able to provide swift, global responses to the latest threats.

The threat management facility 100 may provide threat protection to the enterprise facility 102, where the enterprise facility 102 may include a plurality of networked components, such as client facility, server facility 142, administration facility 134, firewall 138, gateway, hubs and routers 148, threat management appliance 140, desktop users, mobile users, and the like. In embodiments, it may be the end-point computer security facility 152, located on a computer's desktop, which may provide threat protection to a user, and associated enterprise facility 102. In embodiments, the term end-point may refer to a computer system that may source data, receive data, evaluate data, buffer data, or the like (such as a user's desktop computer as an end-point computer), a firewall as a data evaluation end-point computer system, a laptop as a mobile end-point computer, a PDA or tablet as a hand-held end-point computer, a mobile phone as an end-point computer, or the like. In embodiments, end-point may refer to a source or destination for data, including such components where the destination is characterized by an evaluation point for data, and where the data may be sent to a subsequent destination after evaluation. The end-point computer security facility 152 may be an application loaded onto the computer platform or computer support component, where the application may accommodate the plurality of computer platforms and/or functional requirements of the component. For instance, a client facility computer may be one of a plurality of computer platforms, such as Windows, Macintosh, Linux, and the like, where the end-point computer security facility 152 may be adapted to the specific platform, while maintaining a uniform product and product services across platforms. Additionally, components may have different functions to serve within the enterprise facility's 102 networked computer-based infrastructure. For instance, computer support components provided as hubs and routers 148, server facility 142, firewalls 138, and the like, may require unique security application software to protect their portion of the system infrastructure, while providing an element in an integrated threat management system that extends out beyond the threat management facility 100 to incorporate all computer resources under its protection.

The enterprise facility 102 may include a plurality of client facility computing platforms on which the end-point computer security facility 152 is adapted. A client facility computing platform may be a computer system that is able to access a service on another computer, such as a server facility 142, via a network. This client facility server facility 142 model may apply to a plurality of networked applications, such as a client facility connecting to an enterprise facility 102 application server facility 142, a web browser client facility connecting to a web server facility 142, an e-mail client facility retrieving e-mail from an Internet 154 service provider's mail storage servers 142, and the like. In embodiments, traditional large client facility applications may be switched to websites, which may increase the browser's role as a client facility. Clients 144 may be classified as a function of the extent to which they perform their own processing. For instance, client facilities are sometimes classified as a fat client facility or thin client facility. The fat client facility, also known as a thick client facility or rich client facility, may be a client facility that performs the bulk of data processing operations itself, and does not necessarily rely on the server facility 142. The fat client facility may be most common in the form of a personal computer, where the personal computer may operate independent of any server facility 142. Programming environments for fat clients 144 may include CURI, Delphi, Droplets, Java, win32, X11, Android, iOS, and the like. Thin clients 144 may offer minimal processing capabilities, for instance, the thin client facility may primarily provide a graphical user interface provided by an application server facility 142, which may perform the bulk of any required data processing. Programming environments for thin clients 144 may include JavaScript/AJAX, ASP, JSP, Ruby on Rails, Python's Django, PHP, and the like. The client facility may also be a mix of the two, such as processing data locally, but relying on a server facility 142 for data storage. As a result, this hybrid client facility may provide benefits from both the fat client facility type, such as multimedia support and high performance, and the thin client facility type, such as high manageability and flexibility. In embodiments, the threat management facility 100, and associated end-point computer security facility 152, may provide seamless threat protection to the plurality of clients 144, and client facility types, across the enterprise facility 102.

The enterprise facility 102 may include a plurality of server facilities 142, such as application servers, communications servers, file servers, database servers, proxy servers, mail servers, fax servers, game servers, web servers, and the like. A server facility 142, which may also be referred to as a server facility 142 application, server facility 142 operating system, server facility 142 computer, or the like, may be an application program or operating system that accepts client facility connections in order to service requests from clients 144. The server facility 142 application may run on the same computer as the client facility using it, or the server facility 142 and the client facility may be running on different computers and communicating across the network. Server facility 142 applications may be divided among server facility 142 computers, with the dividing depending upon the workload. For instance, under light load conditions all server facility 142 applications may run on a single computer and under heavy load conditions a single server facility 142 application may run on multiple computers. In embodiments, the threat management facility 100 may provide threat protection to server facilities 142 within the enterprise facility 102 as load conditions and application changes are made.

A server facility 142 may also be an appliance facility 140, where the appliance facility 140 provides specific services onto the network. Though the appliance facility 140 is a server facility 142 computer, that may be loaded with a server facility 142 operating system and server facility 142 application, the enterprise facility 102 user may not need to configure it, as the configuration may have been performed by a third party. In an embodiment, an enterprise facility 102 appliance may be a server facility 142 appliance that has been configured and adapted for use with the threat management facility 100, and located within the facilities of the enterprise facility 102. The enterprise facility's 102 threat management appliance may enable the enterprise facility 102 to administer an on-site local managed threat protection configuration, where the administration facility 134 may access the threat resources through an interface, such as a web portal. In an alternate embodiment, the enterprise facility 102 may be managed remotely from a third party, vendor, or the like, without an appliance facility 140 located within the enterprise facility 102. In this instance, the appliance functionality may be a shared hardware product between pluralities of enterprises 102. In embodiments, the appliance facility 140 may be located at the enterprise facility 102, where the enterprise facility 102 maintains a degree of control. In embodiments, a hosted service may be provided, where the appliance 140 may still be an on-site black box to the enterprise facility 102, physically placed there because of infrastructure requirements, but managed by a third party, vendor, or the like.

Simple server facility 142 appliances may also be utilized across the enterprise facility's 102 network infrastructure, such as switches, routers, wireless routers, hubs and routers, gateways, print servers, net modems, and the like. These simple server facility appliances may not require configuration by the enterprise facility 102, but may require protection from threats via an end-point computer security facility 152. These appliances may provide interconnection services within the enterprise facility 102 network, and therefore may advance the spread of a threat if not properly protected.

One way for a client facility to be protected from threats from within the enterprise facility 102 network may be a personal firewall. A personal firewall may be an application that controls network traffic to and from a client, permitting or denying communications based on a security policy. Personal firewalls may be designed for use by end-users, which may result in protection for only the computer on which it's installed. Personal firewalls may be able to control network traffic by providing prompts each time a connection is attempted and adapting security policy accordingly. Personal firewalls may also provide some level of intrusion detection, which may allow the software to terminate or block connectivity where it suspects an intrusion is being attempted. Other features that may be provided by a personal firewall may include alerts about outgoing connection attempts, control of program access to networks, hiding the client from port scans by not responding to unsolicited network traffic, monitoring of applications that may be listening for incoming connections, monitoring and regulation of incoming and outgoing network traffic, prevention of unwanted network traffic from installed applications, reporting applications that make connection attempts, reporting destination servers with which applications may be attempting communications, and the like. In embodiments, the personal firewall may be provided by the threat management facility 100.

Another important component that may be protected by an end-point computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a low level of trust is the Internet 154, because the source of data may be unknown. A zone with an intermediate trust level, situated between the Internet 154 and a trusted internal network, may be referred to as a "perimeter network". Since firewall facilities 138 represent boundaries between threat levels, the end-point computer security facility 152 associated with the firewall facility 138 may provide resources that may control the flow of threats at this enterprise facility 102 network entry point. Firewall facilities 138, and associated end-point computer security facility 152, may also be associated with a network node that may be equipped for interfacing between networks that use different protocols. In embodiments, the end-point computer security facility 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop end-point computer security facility 152.

The interface between the threat management facility 100 and the enterprise facility 102, and through the appliance facility 140 to embedded end-point computer security facilities, may include a set of tools that may be the same for all enterprise implementations, but allow each enterprise to implement different controls. In embodiments, these controls may include both automatic actions and managed actions. Automatic actions may include downloads of the end-point computer security facility 152 to components of the enterprise facility 102, downloads of updates to existing end-point computer security facilities of the enterprise facility 102, uploaded network interaction requests from enterprise facility 102 components to the threat management facility 100, and the like. In embodiments, automatic interactions between the enterprise facility 102 and the threat management facility 100 may be configured by the threat management facility 100 and an administration facility 134 in the enterprise facility 102. The administration facility 134 may configure policy rules that determine interactions, such as developing rules for accessing applications, as in who is authorized and when applications may be used; establishing rules for ethical behavior and activities; rules governing the use of entertainment software such as games, or personal use software such as IM and VoIP; rules for determining access to enterprise facility 102 computing resources, including authentication, levels of access, risk assessment, and usage history tracking; rules for when an action is not allowed, such as whether an action is completely deigned or just modified in its execution; and the like. The administration facility 134 may also establish license management, which in turn may further determine interactions associated with a licensed application. In embodiments, interactions between the threat management facility 100 and the enterprise facility 102 may provide threat protection to the enterprise facility 102 by managing the flow of network data into and out of the enterprise facility 102 through automatic actions that may be configured by the threat management facility 100 or the administration facility 134.

Client facilities within the enterprise facility 102 may be connected to the enterprise facility 102 network by way of wired network facilities 148A or wireless network facilities 148B. Client facilities connected to the enterprise facility 102 network via a wired facility 148A or wireless facility 148B may receive similar protection, as both connection types are ultimately connected to the same enterprise facility 102 network, with the same end-point computer security facility 152, and the same threat protected enterprise facility 102 environment. Mobile wireless facility clients 144B-F, because of their ability to connect to any wireless 148B,D network access point, may connect to the Internet 154 outside the enterprise facility 102, and therefore outside the threat-protected environment of the enterprise facility 102. In this instance the mobile client facility (e.g., the clients 144 B-F), if not for the presence of the end-point computer security facility 152 may experience a malware attack or perform actions counter to enterprise facility 102 established policies. In addition, there may be a plurality of ways for the threat management facility 100 to protect the out-of-enterprise facility 102 mobile client facility (e.g., the clients 144 D-F) that has an embedded end-point computer security facility 152, such as by providing URI filtering in personal routers, using a web appliance as a DNS proxy, or the like. Mobile client facilities that are components of the enterprise facility 102 but temporarily outside connectivity with the enterprise facility 102 network may be provided with the same threat protection and policy control as client facilities inside the enterprise facility 102. In addition, mobile the client facilities may receive the same interactions to and from the threat management facility 100 as client facilities inside the enterprise facility 102, where the mobile client facilities may be considered a virtual extension of the enterprise facility 102, receiving all the same services via their embedded end-point computer security facility 152.

Interactions between the threat management facility 100 and the components of the enterprise facility 102, including mobile client facility extensions of the enterprise facility 102, may ultimately be connected through the Internet 154. Threat management facility 100 downloads and upgrades to the enterprise facility 102 may be passed from the firewalled networks of the threat management facility 100 through to the end-point computer security facility 152 equipped components of the enterprise facility 102. In turn the end-point computer security facility 152 components of the enterprise facility 102 may upload policy and access requests back across the Internet 154 and through to the threat management facility 100. The Internet 154 however, is also the path through which threats may be transmitted from their source. These network threats 104 may include threats from a plurality of sources, including without limitation, web sites, e-mail, IM, VoIP, application software, and the like. These threats may attempt to attack a mobile enterprise client facility (e.g., the clients 144B-F) equipped with an end-point computer security facility 152, but in embodiments, as long as the mobile client facility is embedded with an end-point computer security facility 152, as described above, threats may have no better success than if the mobile client facility were inside the enterprise facility 102.

However, if the mobile client facility were to attempt to connect into an unprotected connection point, such as at a secondary location 108 that is not a part of the enterprise facility 102, the mobile client facility may be required to request network interactions through the threat management facility 100, where contacting the threat management facility 100 may be performed prior to any other network action. In embodiments, the client facility's 144 end-point computer security facility 152 may manage actions in unprotected network environments such as when the client facility (e.g., client 144F) is in a secondary location 108 or connecting wirelessly to a non-enterprise facility 102 wireless Internet connection, where the end-point computer security facility 152 may dictate what actions are allowed, blocked, modified, or the like. For instance, if the client facility's 144 end-point computer security facility 152 is unable to establish a secured connection to the threat management facility 100, the end-point computer security facility 152 may inform the user of such, and recommend that the connection not be made. In the instance when the user chooses to connect despite the recommendation, the end-point computer security facility 152 may perform specific actions during or after the unprotected connection is made, including running scans during the connection period, running scans after the connection is terminated, storing interactions for subsequent threat and policy evaluation, contacting the threat management facility 100 upon first instance of a secured connection for further actions and or scanning, restricting access to network and local resources, or the like. In embodiments, the end-point computer security facility 152 may perform specific actions to remediate possible threat incursions or policy violations during or after the unprotected connection.

The secondary location 108 may have no end-point computer security facilities 152 as a part of its computer components, such as its firewalls 138B, servers 142B, clients 144G, hubs and routers 148C-D, and the like. As a result, the computer components of the secondary location 108 may be open to threat attacks, and become potential sources of threats, as well as any mobile enterprise facility clients 144B-F that may be connected to the secondary location's 108 network. In this instance, these computer components may now unknowingly spread a threat to other components connected to the network.

Some threats may not come directly from the Internet 154, such as from non-enterprise facility controlled mobile devices that are physically brought into the enterprise facility 102 and connected to the enterprise facility 102 client facilities. The connection may be made from direct connection with the enterprise facility's 102 client facility, such as through a USB port, or in physical proximity with the enterprise facility's 102 client facility such that a wireless facility connection can be established, such as through a Bluetooth connection. These physical proximity threats 110 may be another mobile computing device, a portable memory storage device, a mobile communications device, or the like, such as CDs and DVDs, memory sticks, flash drives, external hard drives, cell phones, PDAs, MP3 players, digital cameras, point-to-point devices, digital picture frames, digital pens, navigation devices, tablets, appliances, and the like. A physical proximity threat 110 may have been previously infiltrated by network threats while connected to an unprotected network connection outside the enterprise facility 102, and when connected to the enterprise facility 102 client facility, pose a threat. Because of their mobile nature, physical proximity threats 110 may infiltrate computing resources in any location, such as being physically brought into the enterprise facility 102 site, connected to an enterprise facility 102 client facility while that client facility is mobile, plugged into an unprotected client facility at a secondary location 108, and the like. A mobile device, once connected to an unprotected computer resource, may become a physical proximity threat 110. In embodiments, the end-point computer security facility 152 may provide enterprise facility 102 computing resources with threat protection against physical proximity threats 110, for instance, through scanning the device prior to allowing data transfers, through security validation certificates, through establishing a safe zone within the enterprise facility 102 computing resource to transfer data into for evaluation, and the like.

Having provided an overall context for threat detection, the description now turns to devices, systems, and methods for network access control (NAC) based on traffic monitoring and vulnerability detection using process related information.

Implementations may include a hybrid system, where information about a malicious attempt is derived locally and preventive decision making is done centrally. The hybrid nature of implementations can overcome major flaws with prior art systems—i.e., implementing major assessment functionalities at host-level being time and resource consuming and can lead to productivity issues, where overall host performance suffers; and network level sensors can miss crucial information about an alert due to which possibility of attack increases. Implementations take advantages of both of these approaches which can lead to maximum productivity in the network. Specifically, an agent to intercept process related information may be deployed on each workstation in a local network. This agent may relay the process information to a centralized engine, where the engine attempts to find vulnerabilities if present with the process. If a vulnerability is detected, the process may be blocked and the information for the vulnerable process can be stored in an alert store database. A network administrator may use this database for preventive actions.

A connection as described herein may include an attempt by a process running on a host machine to communicate with another process on another host. The intent of a connection may be a healthy communication or a malicious attempt. Implementations attempt to tap the malicious intent of a process.

Figure 2:
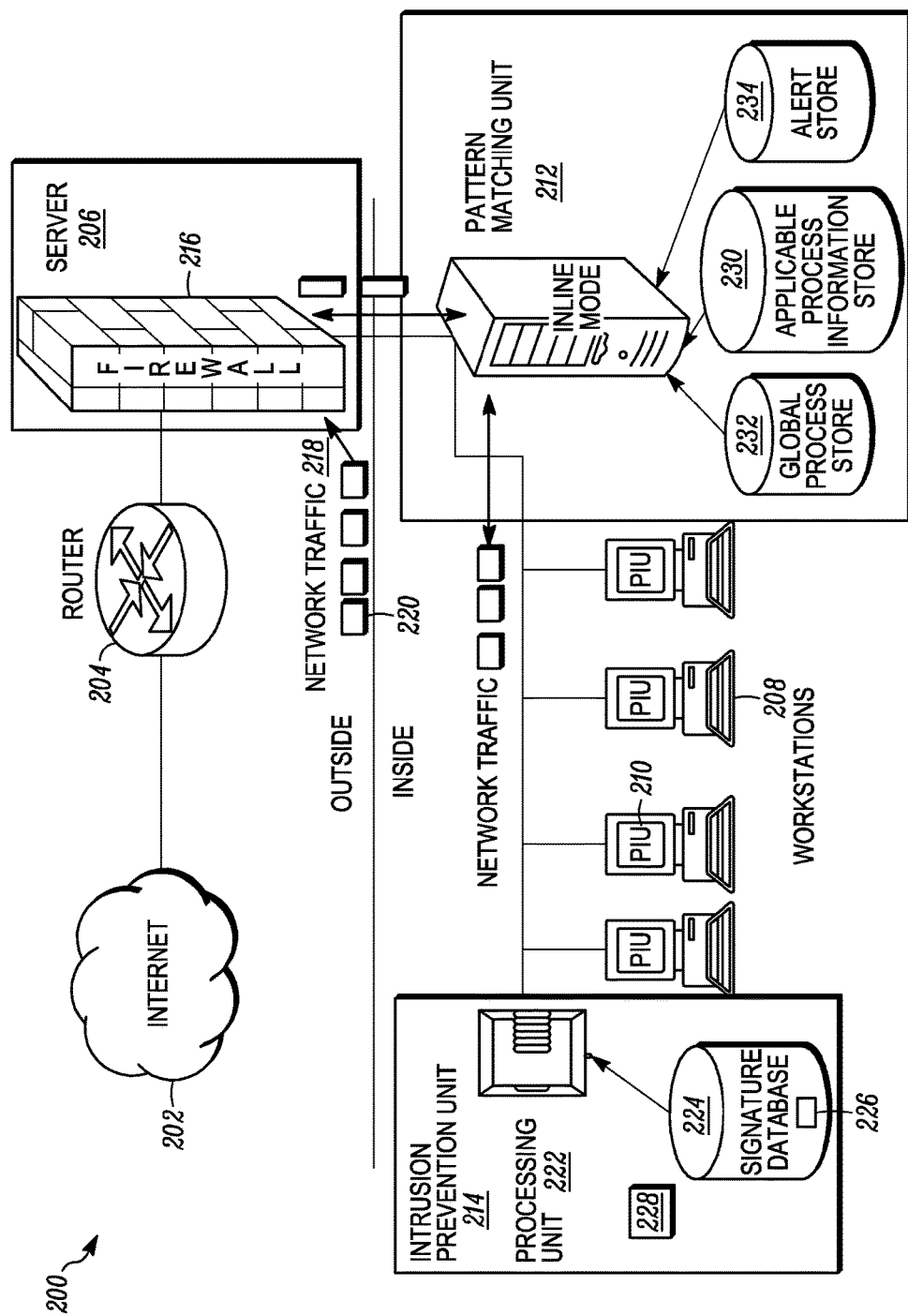
FIG. 2 illustrates an implementation of a network environment for network access control based on traffic monitoring and vulnerability detection using process related information.

FIG. 2 illustrates a network environment for network access control based on traffic monitoring and vulnerability detection using process related information. The network environment 200 may include a data network 202 (such as the Internet), a router 204, a server 206, a plurality of devices 208 (e.g., workstations or endpoints on a network), a process intercepting unit 210, a pattern matching unit 212, and an intrusion prevention unit 214.

The data network 202 may include any network or combination of networks as described herein, including local area networks (LANs), wide area networks (WANs), wireless networks, combinations of networks, and the like. The local network may interact with data network 202 resources external to the local network via the router 204.

The router 204 may send and receive network packets 220, e.g., included in the network traffic 216, from the local network to the internet. The router 204 may be or include any network node or device as recognized in the networking arena, e.g., that which is capable of making connections between multiple networks (e.g., at the transport layer of the open systems interconnection (OSI) model). The router 204 may examine protocol information present in the network packet 220, after which the router 204 makes the decision of forwarding the same. The router 204 may forward the network packets 220 from inside the local network to the internet and vice versa, i.e., after inspecting the network packets 220.

The server 206 may be protected by a firewall 216 that allows predetermined network traffic 218 through to the plurality of devices 208.

The devices 208 may be or may include any type of network endpoint or endpoints as described herein. Although depicted as desktop computer workstations, it should be recognized that a device 208 may be any suitable device that has processes and communicates over a network, including without limitation a desktop computer, laptop computer, personal digital assistant, tablet, mobile phone, television, set top box, a wearable computer (e.g., watch, jewelry, or clothing), home devices (e.g., a thermostat or home appliance controller), and so forth. Each of the devices 208 may receive at least one connection request from a process running on a host. One or more of the devices 208 may include a process intercepting unit 210. As depicted in this illustrative example, each device 208 includes a process intercepting unit (PIU) 210. A process intercepting unit 210 may also or instead be included in the intrusion prevention unit 214. The process intercepting unit 210 may extract process related information from the device 208.

The process intercepting unit 210 may forward information to the pattern matching unit 212, the information including one or more of process related information, connection information, and network packet information. The process related information may include a process name and a process version.

Inline deployment may include deployment where all incoming and outgoing network traffic always passes through the pattern matching unit 212. Thus, the pattern matching unit may sit in the flow of or monitor network traffic. The pattern matching unit 212 may use other network devices (not shown) to monitor network traffic. When the pattern matching unit is deployed in an inline mode, the second network level hook by the process intercepting unit may not be required. When the process intercepting unit 210 intercepts any open socket call, it may generate a user datagram protocol (UDP) packet containing information such as a system identifier (i.e., a unique identifier of a system, such as MAC address or IP address), a source IP or destination IP address (i.e., the source and destination IP address of a connection, respectively), a protocol name (i.e., transport layer protocol), and process information such as process name and version.

In the case of pattern matching unit 212 deployment in an inline mode, the network level hooking may not be required or used since both the process intercepting unit and the pattern matching unit are inline. Therefore, packets transferred from the system may be passing through the pattern matching unit. For example, the pattern matching unit 212 can have network layer hooking.

The process intercepting unit 210 may take advantage of its host-based feature where the process intercepting unit 210 retrieves granular information that may not be possible in a network-based scenario. The process intercepting unit 210 may hook at one or more places. For example, a hook may be implemented at a socket level which intercepts socket functions like open, close, sendto, and recvfrom. A hook may intercept incoming and outgoing network packets 220 (e.g., at the network layer) to send those network packets 220 to the pattern matching unit 212.

The pattern matching unit 212 may receive the information from the process intercepting unit 210. The pattern matching unit 212 may process the information from the process intercepting unit 210, and determine and/or identify patterns in the information from the process intercepting unit 210 and/or information collected from the network. The pattern matching unit 212 may forward information to the intrusion prevention unit 214 for further processing and/or analysis.

The intrusion prevention unit 214 may inspect the network packets header and payload information for detection of known vulnerabilities. As used herein, the vulnerabilities in network security may be an amalgamation of three situations: a system or resource susceptible to flaws, an attacker gaining access to that flaw, and the capability of an attacker to exploit that flaw by launching an attack on the system or resource.

The intrusion prevention unit 214 may include a processing unit 222 and a database 224 (e.g., a signature database). The database 224 may include a plurality of signatures 226 defining a set of rules to detect attacks or intrusive activities on the network that can occur through the process. The signatures 226 may be prepared based on information relating to the process. Each of the signatures 226 may include a unique signature identification code. The signatures 226 in the database 224 may contain possible alert information. Packet information from the network packets 220 may be matched against the signature 226, where a positive match is termed as a threat or an attack. An example of a signature 226 used by a popular open source intrusion detection system (IDS) suricata is:

alert http $EXTERNAL_NET any→$HTTP_SERVERS $HTTP_PORTS (msg:"ET WEB_SERVER Possible SQL Injection Attempt DELETE FROM"; flow:established,to_server; uricontent:"DELETE"; nocase; uricontent:"FROM"; nocase; pcre:"/DELETE.+FROM/Ui"; classtype:web-application-attack; reference:url,en.wikipedia.org/wiki/SQL_injection; reference:url,doc.emergingthreats.net/2006443; sid:2006443; rev:10;). This signature identifies an attempt of structured query language (SQL) injection attack present in web uniform resource locator (URL).

The intrusion prevention unit 214 may receive the information from the pattern matching unit 212. The intrusion prevention unit 214 may verify the information against the signatures 226 stored in the database 224 to identify a vulnerability. On basis of this verification, the intrusion prevention unit 214 may detect a known vulnerability in the network activities and establish a verification report 228 based on the identification and detection. The verification report 228 may then be sent to the pattern matching unit 212. The verification report 228 may include unique signature identification code. The pattern matching unit 212 may receive signatures from the intrusion prevention unit 214 and the pattern matching unit 212 may determine whether the received signatures match the data.

The pattern matching unit 212 may further include a database 230 (e.g., an applicable process information database) containing a unique signature identification code, a signature name, an applicable process name, and an applicable process version. The pattern matching unit 212 may receive the verification report 228 from the intrusion prevention unit 214. The pattern matching unit 212 may verify whether the verification report 228 is applicable to the process associated with network packet 220. In verification, the pattern matching unit 212 may match the signature identification code mentioned in the verification report 228 with the signature identification code stored in the database 230 (i.e., the applicable process information database). On the basis of this verification, the pattern matching unit 212 may send an authorization decision to the process intercepting unit 210 regarding continuing or blocking of the initiated connection request from the process running on the host.

The above referenced verification may be done with the help of a global process store 232. The global process store 232 may be implemented as a two level linked list. In the first level linked list, each node may store a hash value to identify a unique host and a host name. Each node of the first linked list may point to a set of nodes of a second level linked list where each node stores connection and process information about each connection initiated from that host. The pattern matching unit 212 may perform a lookup on the global process store 232. The pattern matching unit 212 may match applicable process information retrieved from the applicable process information database with the associated process information in the linked list. If a match is found, then pattern matching unit 212 may send an authorization decision of blocking the initiated connection by the associated process to the process intercepting unit 210.

On receiving the disallowance decision from the pattern matching unit 212, the process intercepting unit 210 may block the connection. The pattern matching unit 212 may also add the vulnerable process information to an alert store 234. The alert store 234 may include a database that stores information about vulnerable or malfunctioning processes. A network administrator may use an alert store 234 for preventive actions. In some implementations, the alert store 234 can be a part of the pattern matching unit 212.

The database 230, i.e., the applicable process information database, may fulfill the purpose of identifying which signature 226 is applicable to which process with a specific version. The database 230 may contain fields such as those defined as signature id, signature name, applicable process name, applicable process version, and so forth.

In an implementation, a network administrator defines the applicability of attack signatures to different processes. A parser program may read the signature file of the intrusion prevention system (IPS) engine and display a table of signatures to the administrator. The administrator may specify the corresponding process name and version for each signature. The signature and corresponding process name/version may be stored in the database 230, i.e., the applicable process information database.

Figure 3:
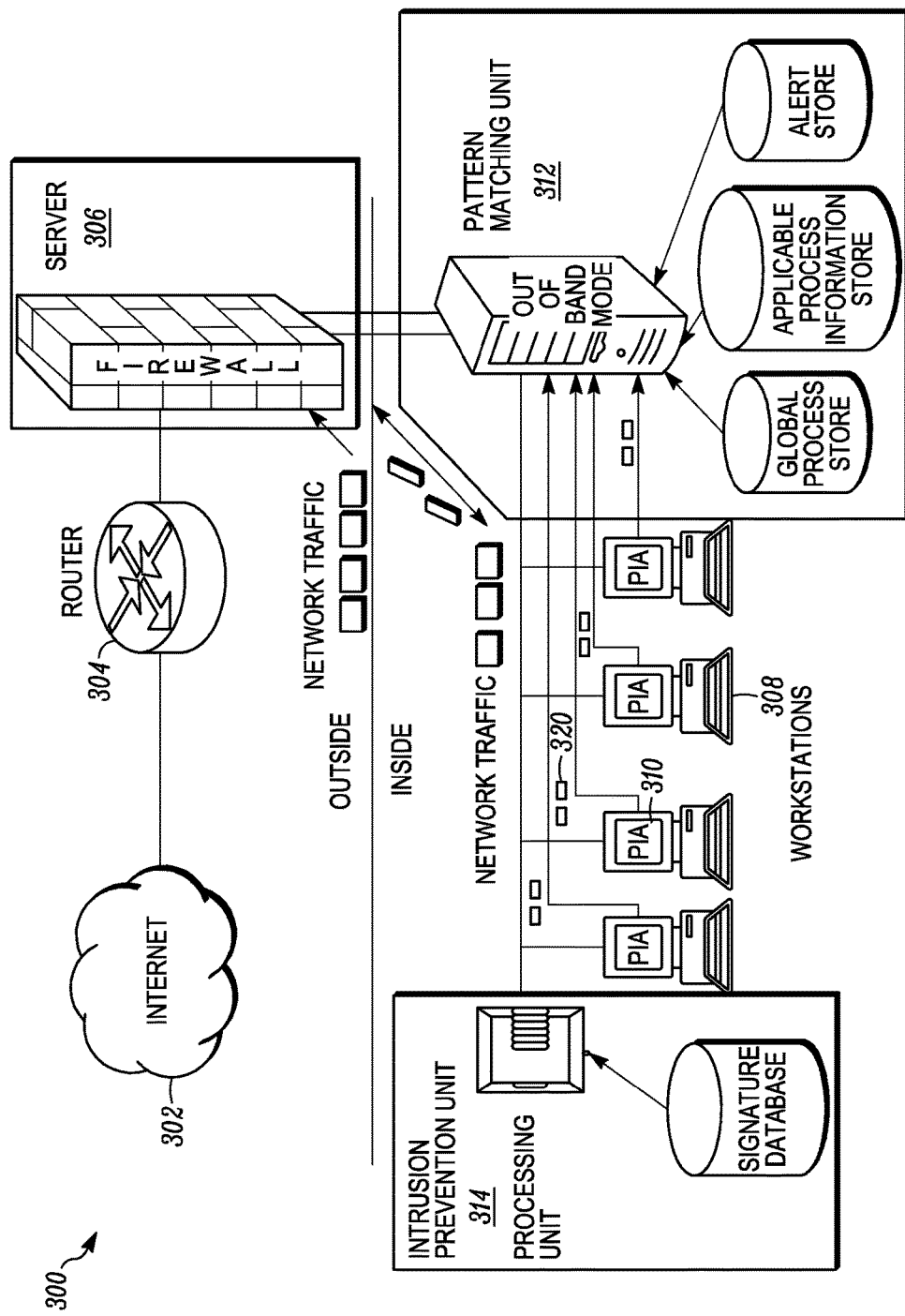
FIG. 3 illustrates an implementation of a network environment for network access control based on traffic monitoring and vulnerability detection using process related information.

FIG. 3 illustrates another network environment for network access control based on traffic monitoring and vulnerability detection using process related information. Similar to the figure above, the network environment 300 may include a data network 302, a router 304, a server 306, a plurality of devices 308, a process intercepting unit 310, a pattern matching unit 312, and an intrusion prevention unit 314. However, while the figure above shows the pattern matching unit deployed in an inline mode, FIG. 3 shows the pattern matching unit 312 deployed in an out of band mode.

In the case of out of band deployment, the process intercepting unit 310 may copy intercepted packets 320 and send them to the pattern matching unit 312 over a dedicated channel. The dedicated channel may be, for example, a transmission control protocol (TCP) connection or any standard tunneling protocol.

When the pattern matching unit 312 is deployed in an out of band mode, the pattern matching unit 312 may start TCP server listening on a dedicated port. The process intercepting unit 310 running on each device 308 may initiate a dedicated TCP connection from each one of the devices 308. All of the packets transferred on that device 308 may be sent to the pattern matching unit 312 using this dedicated TCP connection. In this manner, a TCP listener can have multiple incoming packet streams. Each packet stream may be uniquely identified and differentiated by a system identifier. The pattern matching unit 312 may put a wrapper (e.g., a Hashvalue of a combination of MAC ID & Source IP Address), on every packet to associate it with the respective device 308. The pattern matching unit 312 may also accumulate all of these packets in a common packet queue.

Another process running under the TCP listener may keep a watch on this queue. As soon as a packet arrives, it may send that packet to the intrusion prevention unit 314 using a standard available interface and an application program interface (API) provided by the intrusion prevention unit 314. The intrusion prevention unit 314 may inspect the packet for known vulnerabilities using standard signature rule files. If any vulnerability is found, the intrusion prevention unit 314 may respond back to the calling process with signature rule identification information. From a packet wrapper, the intrusion prevention unit 314 may retrieve a system identifier to lookup a second level linked list representing that particular system's process and associated connection information.

For example, from a packet, the intrusion prevention unit 314 may fetch five tuple information—Source IP, Destination IP, Source Port, Destination Port, Protocol—to lookup into a retrieved second-level linked list. This lookup may provide associated process information. The pattern matching unit 312 may now match the associated process information and the applicable process information. If associated application information belongs to this list, then the pattern matching unit 312 may conclude that the process is either compromised or attacked. In that case, the pattern matching unit 312 may store this information into an alert store database. If the associated process information and the applicable process information do not match, it may be considered as a false alarm. An administrator may take a decision on every entry in the alert database, and mark it as a quarantine decision.

When the pattern matching unit 312 receives a UDP packet containing the above stated information, it may respond back with an authorization decision of connection initiated by a process. Once the process intercepting unit 310 receives the decision, the process intercepting unit 310 may either allow or block the connection, as per the decision given by pattern matching unit 312.

The process intercepting unit 310 may disallow only the process and not the host for communication, e.g., if the authorization decision indicates a matching of the signature identification code mentioned in the verification report with the code stored in the application process information database.

Implementations may provide precise access control and protection of network resources against malicious attempts. This can be done without compromising the performance of a network. Implementations may support the veracity that it is the process which is unhealthy and not the host. Therefore, instead of blocking a host, implementations may block the process that is vulnerable or malfunctioning. Another advantage of the implementations described herein includes, since details of the vulnerable process are stored in an alert store database or the like, remediation of the unhealthy processes may be provided by applying patches or hot fixes. Yet another advantage of implementations may include a considerable reduction in the false positive rate.

Figure 4:
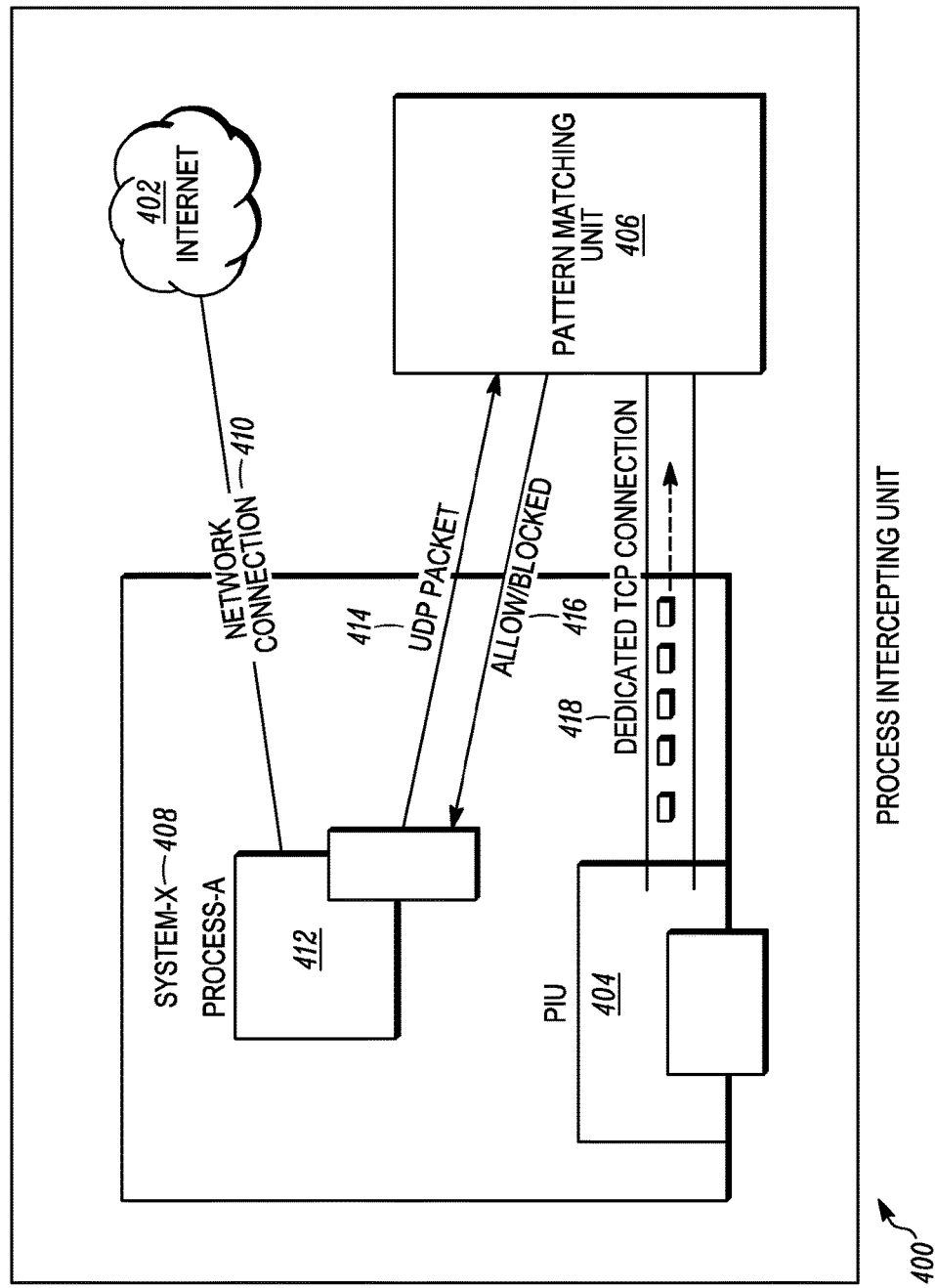
FIG. 4 illustrates an implementation of a process intercepting unit.

FIG. 4 illustrates a process intercepting unit. Specifically, the figure shows a system 400 including a data network 402, process intercepting unit 404, and a pattern matching unit 406.

As shown in the figure, the process intercepting unit 404 may be included on a device 408 (shown in the figure as "System-X") connected through a network connection 410 to the data network 402. The network connection 410 may be established by a process 412 (shown in the figure as "Process-A") on the device 408.

The pattern matching unit 406 may be configured to receive a UDP packet 414 containing any of the information as described herein. The pattern matching unit 406 may formulate a decision that signals (i.e., through a signal 416) whether to allow or block a connection of the process 412.

The process intercepting unit 404 may send packets to the pattern matching unit 406 over a dedicated channel 418, e.g., a TCP connection or any standard tunneling protocol.

Figure 5:
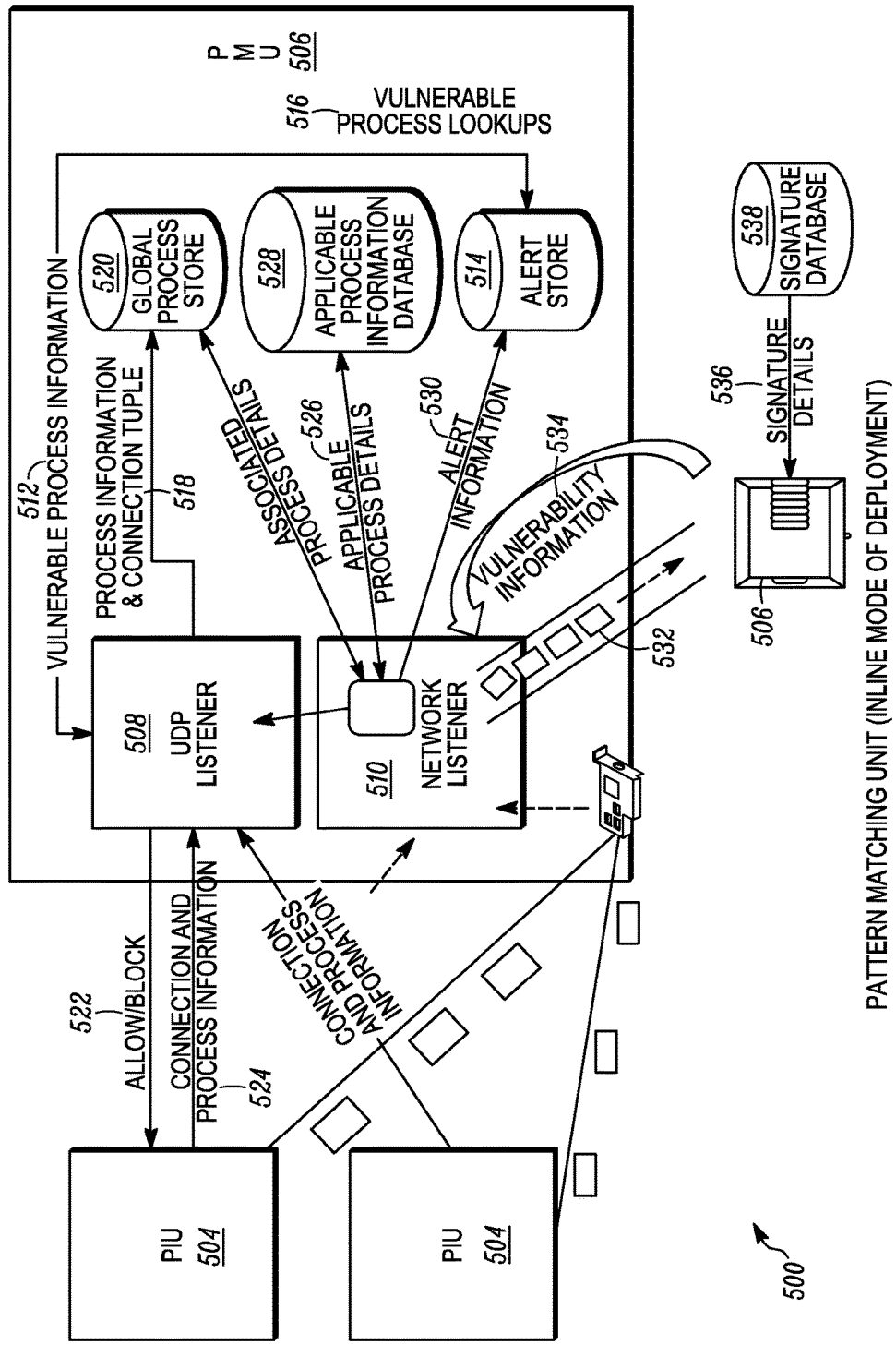
FIG. 5 illustrates an implementation of a pattern matching unit.
Figure 6:
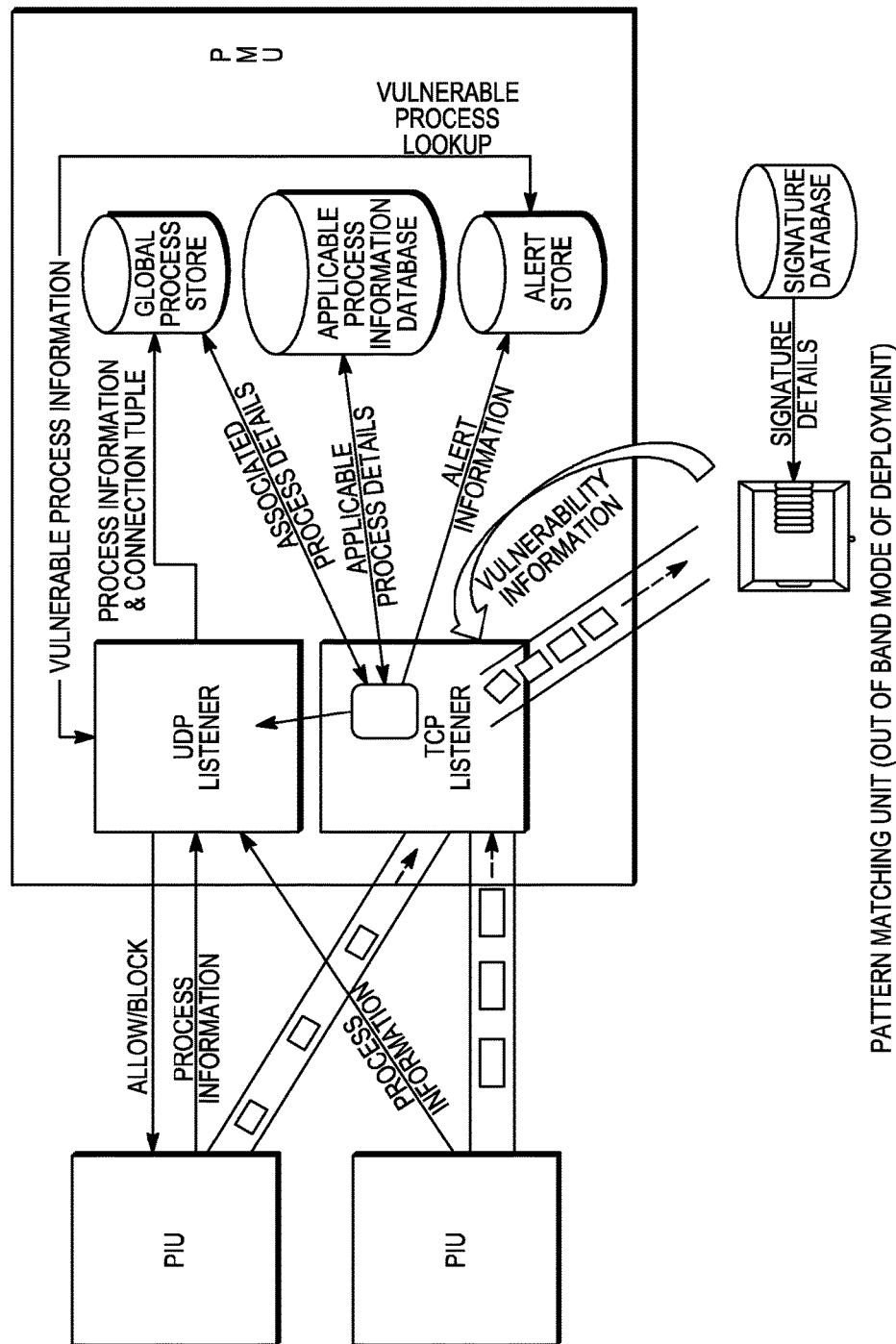
FIG. 6 illustrates an implementation of a pattern matching unit.

FIG. 5 and FIG. 6 each illustrate a pattern matching unit in a system. FIG. 5 shows a pattern matching unit in an inline mode of deployment and FIG. 6 shows a pattern matching unit in an out of band mode of deployment.

As shown in FIG. 5, the system 500 may include a pattern matching unit 502 interacting with a process intercepting unit 504 and an intrusion prevention unit 506.

The pattern matching unit 502 may include (or be in communication with) a UDP listener 508 and a network listener 510.

The UDP listener 508 may send or receive vulnerable process information 512 with an alert store 514, e.g., through a vulnerable process lookup 516. The UDP listener 508 may also or instead send process information and connection tuple 518 to a global process store 520. The UDP listener 508 may also or instead send allow/block information 522 to the process intercepting unit 504, and receive connection and process information 524 therefrom.

The network listener 510 may send or receive associated process details 526 with one or more of the global process store 520 and an application process information database 528. The network listener 510 may also or instead send or receive alert information 530 with the alert store 514.

The network listener 510 may also or instead be in communication with the intrusion prevention unit 506. For example, the network listener 510 may send network packets 532 to the intrusion prevention unit 506 and receive vulnerability information 534.

The intrusion prevention unit 506 may receive signature details from a signature database 538.

Figure 7:
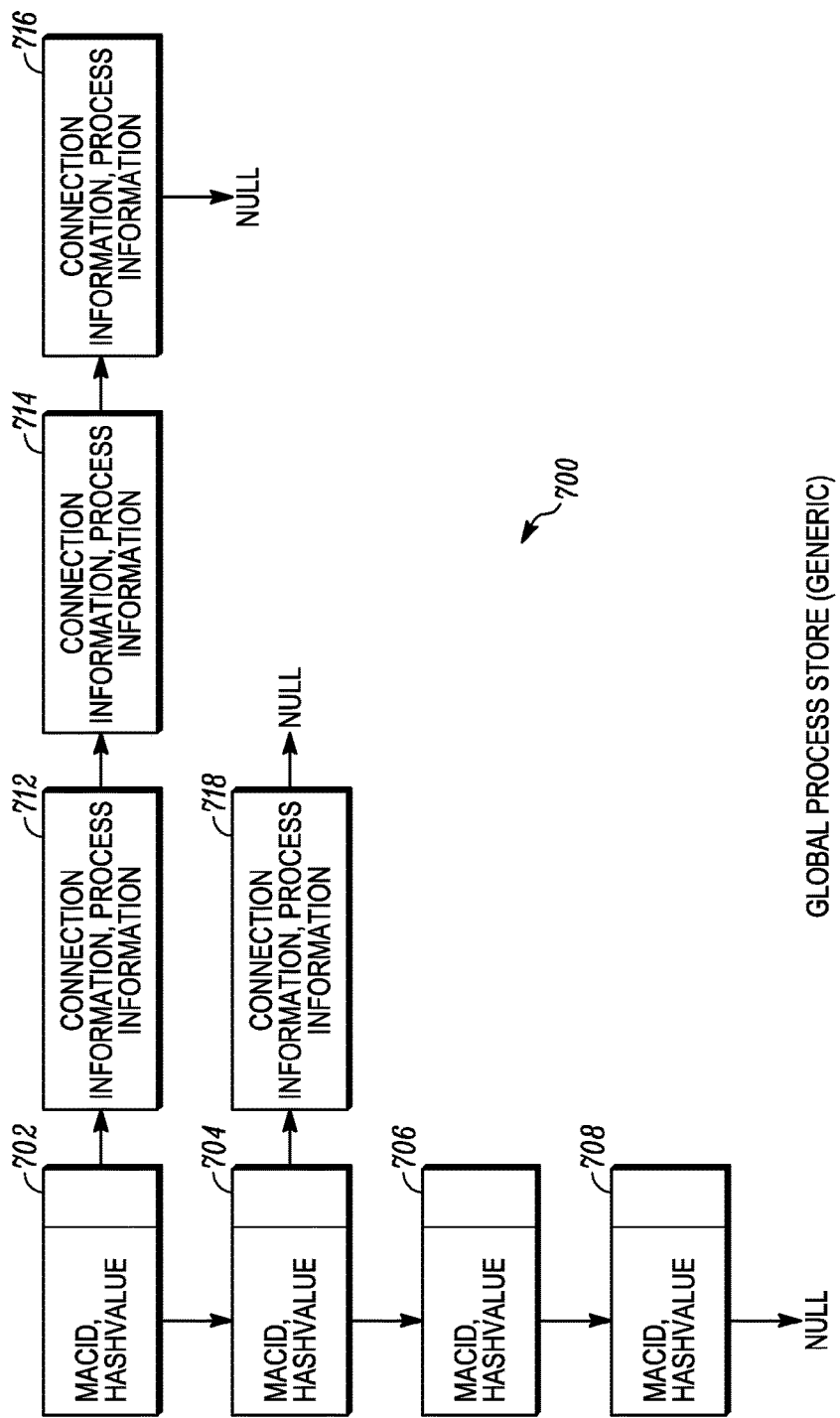
FIG. 7 illustrates an implementation of global process store.

Referring to FIG. 7, an illustrative example of an implementation of a generic global process store 700 is shown. The global process store 700 may include a double linked list, with a list of hosts 702, 704, 706, 708 shown in the vertical direction, and connection information and process information 712, 714, 716, and 718 associated with the hosts 702, 704, 706, 708 shown in the horizontal direction.

As depicted in this example, the global process store 700 includes for each host 702, 704, 706, 708 a MAC ID and a hash value, e.g., to identify a unique host and/or a host name. As depicted in this example, one host 702 has associated connection information and process information 712, 714, and 716. Another host 704 has connection information and process information 718. The other hosts 706, 708 do not currently have connection information and process information.

Figure 8:
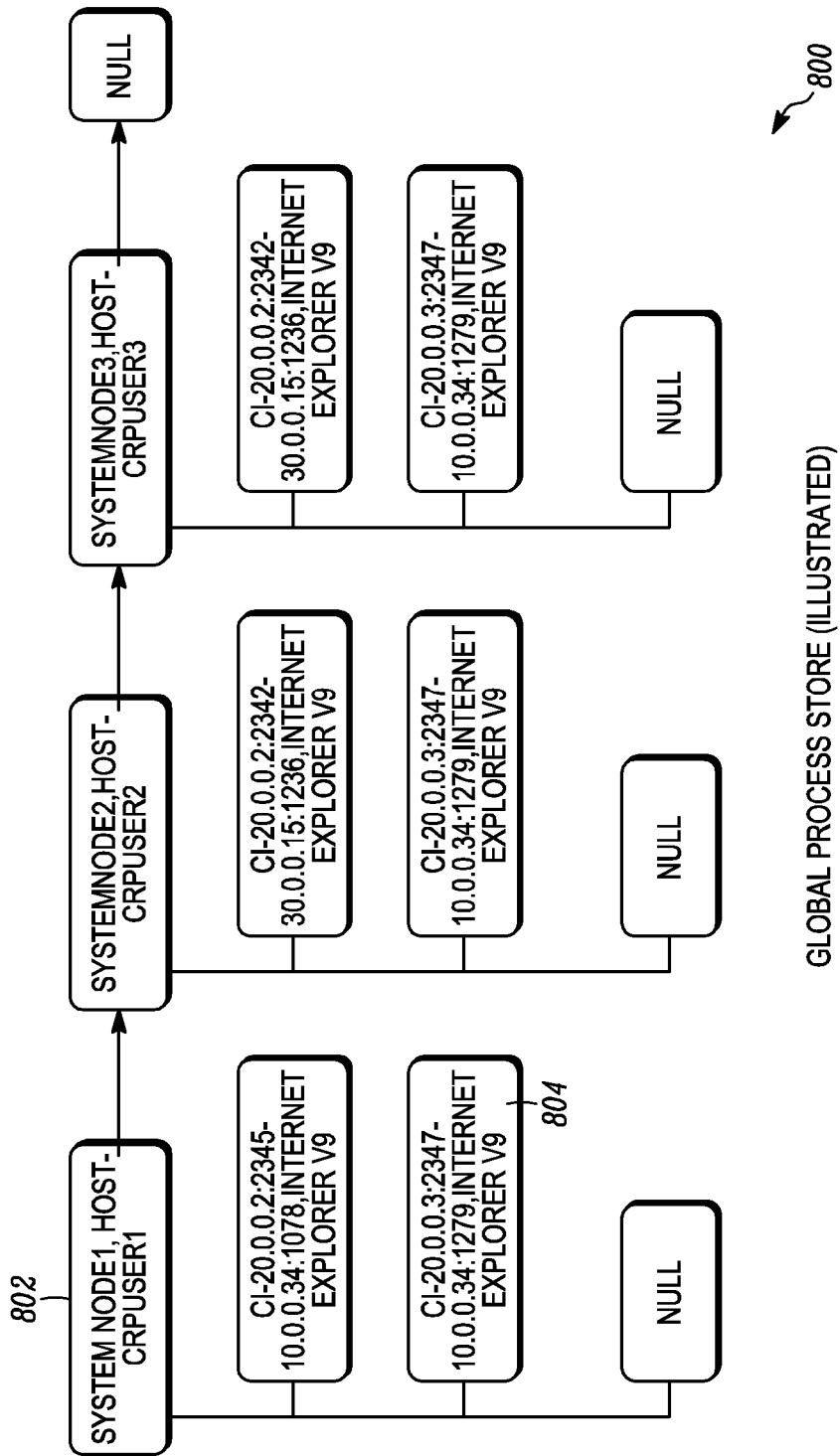
FIG. 8 illustrates an implementation of a global process store.

Referring to FIG. 8, an illustrative example of an implementation of a global process store 800 may include host information 802 such as network (IP) connection and process information 804. In this example, a double linked list is depicted, with a list of three hosts shown in the horizontal direction, and lists of connection shown in the vertical direction.

In this example, SystemNode1, which is host CRPUSER1 has two connections. One connection is depicted as 20.0.0.2:2345 to 10.0.0.34:1078, and the process is identified as Internet Explorer v9. One connection is depicted as 20.0.0.3:2347 to 10.0.0.34:1279, and the process is identified as Internet Explorer v9.

In this example, SystemNode2, which is host CRPUSER2 has two connections. One connection is depicted as 20.0.0.2:2342 to 30.0.0.15:1236, and the process is identified as Internet Explorer v9. One connection is depicted as 20.0.0.3:2347 to 10.0.0.34:1279, and the process is identified as Internet Explorer v9.

In this example, SystemNode3, which is host CRPUSER3 has two connections. One connection is depicted as 20.0.0.2:2342 to 30.0.0.15:1236, and the process is identified as Internet Explorer v9. One connection is depicted as 20.0.0.3:2347 to 10.0.0.34:1279, and the process is identified as Internet Explorer v9.

FIG. 9 shows information included in an application process information database 900 of a pattern matching unit. The application process information database 900 may include, e.g., information such as a signature ID 902, a signature name 904, an applicable process 906, an applicable process version 908, and so on. Other information may be included as well. The application process information database 900 may be used by the pattern matching unit to match signatures to process vulnerabilities.

In the first row, a first example signature has a signature ID 902 that is 2017478. The name 903 of this signature is IE Memory Corruption Vulnerability. The applicable process 906 is Internet Explorer, with the applicable process version 908 shown to be versions 7 to 9. In the second row, second signature has signature ID 902 that is 100000447, the signature name is Mozilla Firefox DOMNodeRemoved attack attempt, the applicable process 906 is Mozilla Firefox, and the applicable process version 908 is "Any." In the third row, the third signature has Signature ID 902 is 2101809, the signature name 904 is Apache Chunked Encoding worm attempt, the applicable process 906 is Apache, and the applicable process 908 is version 1.3.x. In the fourth row, the fourth example signature has Signature ID 902 that is 2002993, the signature name 904 is Rapid POP3S Connections—Possible Brute Force Attack. For this signature there is no specific process 906 or process version 908. For example, the signature may be associated with any POP3S connections. In the fifth row, the fifth example signature has Signature ID 902 that is 7393, the signature name 904 is Smtp_auth_failure, the applicable process 906 is telnet, and the applicable process version is "Any."

FIG. 10 shows information included in an alert store database 1000 of a pattern matching unit. The alert store database 1000 includes illustrative examples of alerts that may be determined by various implementations. In this illustrative example, connection alerts and intrusion alerts are stored. Other alerts also may be stored in the alert store database 1000.

The alert store database 1000 may include, e.g., information such as an alert ID 1002, an alert type 1004, an alert name 1006, a timestamp 1008, a process name 1010, a process version 1012, network information 1014, an applicable process 1016, and so on. A first alert has an alert ID 1002 that is 1. The alert type 1004 is Connection, the alert name 1006 is Connection, the Timestamp 1008 is 1/12/2013 10:40:45, the Process Name 1010 is Internet Explorer, the Process Version 1012 is 7.x, and the Network Information 1014 includes a connection 10.1.1.1:50000 to 10.1.1.1:80. No applicable process 1016 was identified.

A second alert has an alert ID 1002 that is 2. The alert type 1004 is Intrusion, the alert name 1006 is IE Memory Corruption Vulnerability, the Timestamp 1008 is 1/12/2013 10:40:46, the Process Name 1010 is Internet Explorer, the Process Version 1012 is 7.x, and the Network Information 1014 includes a connection 10.1.1.1:50000 to 10.1.1.1:80. In this alert, Internet Explorer v6 to v9 is indicated as the applicable process.

A third alert has an alert ID 1002 that is 3. The alert type 1004 is Connection, the alert name 1006 is Connection, the Timestamp 1008 is 1/12/2013 10:40:46, the Process Name 1010 is Internet Explorer, the Process Version 1012 is 7.x, and the Network Information 1014 includes a connection 10.1.1.1:50001 to 20.1.1.1:12345. In this alert, no applicable process is identified.

A fourth alert has an alert ID 1002 that is 4. The alert type 1004 is Intrusion, the alert name 1006 is Port Scan, the Timestamp 1008 is 1/12/2013 10:40:47, the Process Name 1010 is Internet Explorer, the Process Version 1012 is 7.x, and the Network Information 1014 includes a connection 10.1.1.1:50002 to 255.255.255.255:25. In this alert, NMap is identified as the applicable process 1016.

A fifth alert has an alert ID 1002 that is 5. The alert type 1004 is Connection, the alert name 1006 is Connection, the Timestamp 1008 is 1/12/2013 10:40:48, the Process Name 1010 is Internet Explorer, the Process Version 1012 is 7.x, and the Network Information 1014 includes a connection 10.1.1.1:50003 to 10.1.1.2:25. In this alert, NMap is identified as the applicable process 1016.

A sixth alert has an alert ID 1002 that is 6. The alert type 1004 is Intrusion, the alert name 1006 is Port Scan, the Timestamp 1008 is 1/12/2013 10:40:49, the Process Name 1010 is NMap, the Process Version 1012 is 2.x, and the Network Information 1014 includes a connection 10.1.1.3:10000 to 255.255.255.255:25. In this alert, NMap is identified as the applicable process 1016.

A seventh alert has an alert ID 1002 that is 7. The alert type 1004 is Connection, the alert name 1006 is Connection, the Timestamp 1008 is 1/12/2013 10:40:49, the Process Name 1010 is Google Chrome, the Process Version 1012 is 5.x, and the Network Information 1014 includes a connection 10.1.1.4:20000 to 20.1.1.1:89. In this alert, there is no applicable process 1016 identified.

Figure 12:
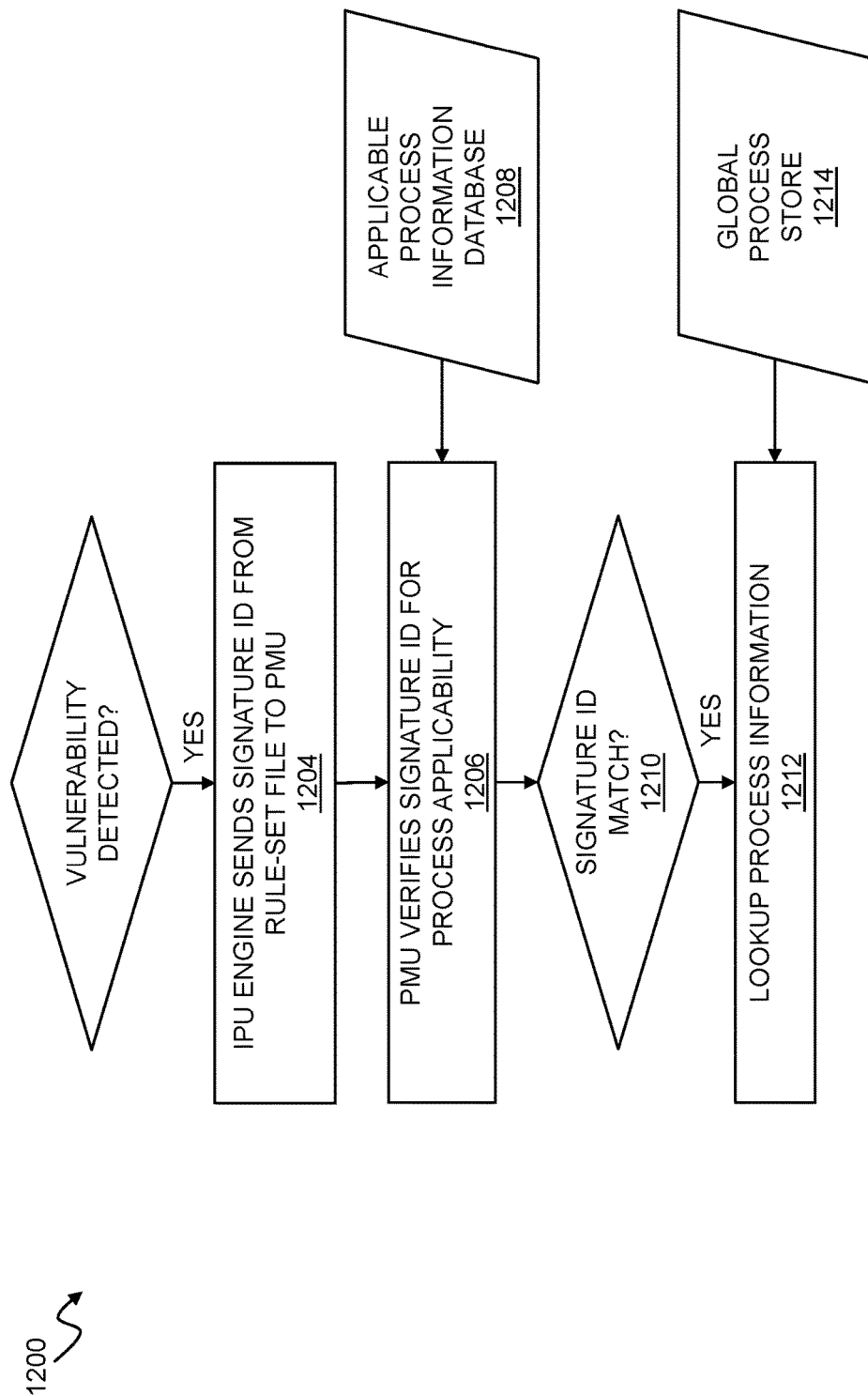
Figure 13:
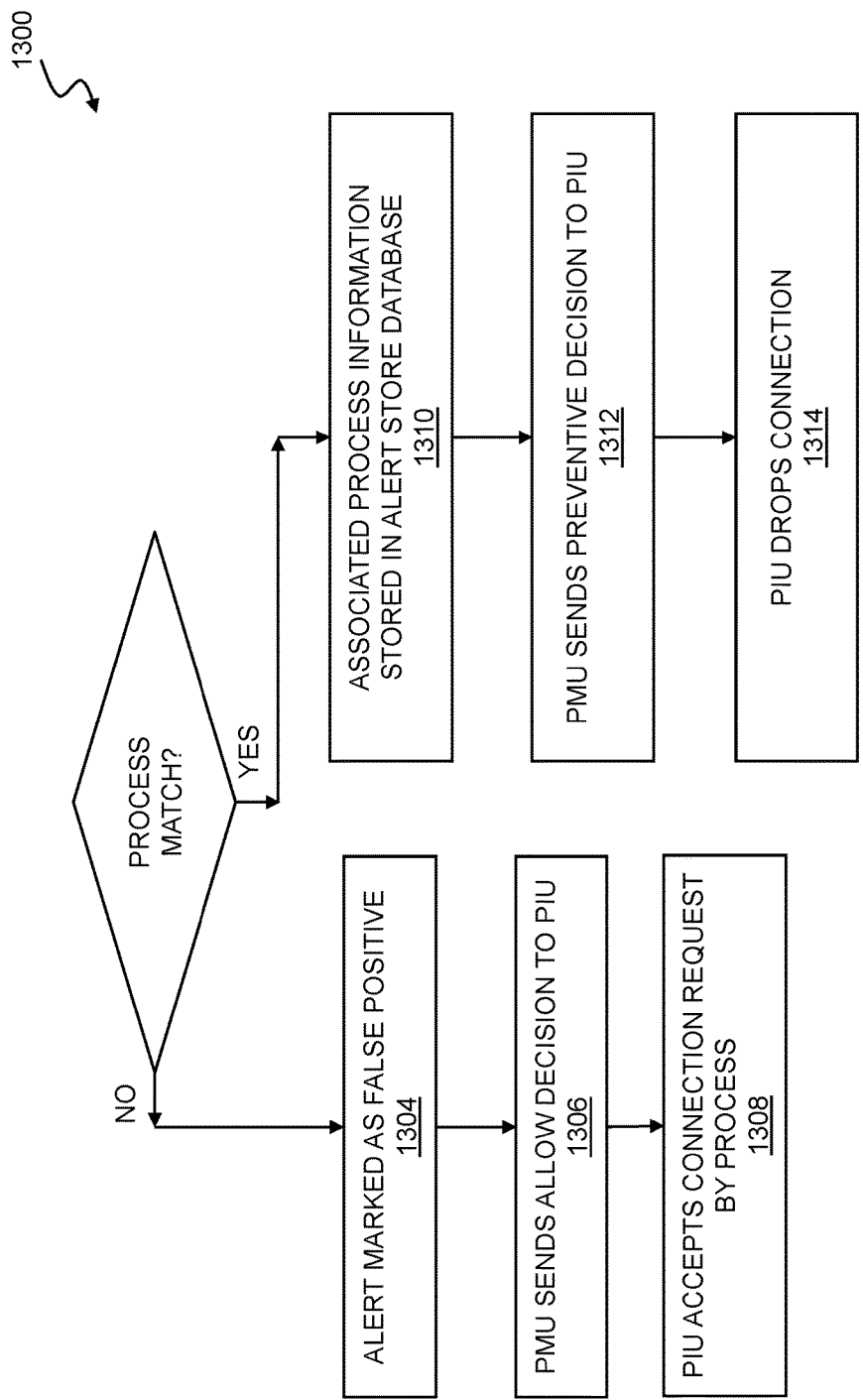

FIGS. 11-13 include flowcharts of an implementation of a method for network access control, e.g., based on traffic monitoring and vulnerability detection using process related information.

As shown in step 1102, a method 1100 may include receiving, by at least one device in a plurality of devices, at least one connection request from a process running on a host.

As shown in step 1104, the method 1100 may include having a process intercepting unit (PIU) or the like hook the process. This may include extracting, by a process intercepting unit of the device, the process related information.

As shown in step 1106, the method 1100 may include creating a connection with a pattern matching unit (PMU). This may include initiating a connection from the process intercepting unit to the pattern matching unit. The connection may be used to forward, by the process intercepting unit to a pattern matching unit, information such as process related information, connection information, and network packet information.

As shown in step 1110, the method 1100 may include sending process and connection information to the pattern matching unit if the pattern matching unit is in an inline mode.

As shown in step 1112, the method 1100 may include sending process information, connection information, and outgoing/incoming packets to the pattern matching unit if the pattern matching unit is in an out of band mode.

As shown in step 1114, the method 1100 may include the pattern matching unit putting a wrapper around the packet for system identification.

As shown in step 1116, the method 1100 may include the pattern matching unit sending a wrapped packet or packets to an intrusion prevention unit (IPU) engine for vulnerability detection.

The method 1100 may include receiving, by the pattern matching unit, the information from the process intercepting unit and forwarding the information to the intrusion prevention unit. The intrusion prevention unit may receive the information from the pattern matching unit and send a verification report to the pattern matching unit.

FIG. 12 shows an implementation of a method 1200 when a vulnerability is detected.

As shown in step 1204, the method 1200 may include the intrusion prevention unit sending a signature identification from a rule-set file to the pattern matching unit.

As shown in step 1206, the method 1200 may include the pattern matching unit verifying the signature identification for process applicability. This may include the use of an applicable process information database as shown in step 1208 of the method 1200.

As shown in step 1210, if the signature identification sent by the intrusion prevention unit matches with the signature identification stored in the applicable process information database, the method 1200 may proceed to step 1212. If it does not match, another signature may need to be matched, or there may be no match.

As shown in step 1212, the method 1200 may include a lookup of the process information. This information may be received from a global process store as shown in step 1214 of the method 1200.

FIG. 13 shows an implementation of a method 1300 including steps for when a process is a match such that the applicable process matches the associated process.

As shown in step 1304, the method 1300 may include, if the process is not a match, marking the alert as a false positive.

As shown in step 1306, the method 1300 may include the pattern matching unit sending an allow decision to the process intercepting unit.

As shown in step 1308, the method 1300 may include the process intercepting unit accepting the connection request by the process. For example, the connection may be permitted.

As shown in step 1310, the method 1300 may include, if the process is a match, storing the associated process information, e.g., in an alert store database.

As shown in step 1312, the method 1300 may include the pattern matching unit sending a preventative decision of blocking or dropping to the process intercepting unit.

As shown in step 1314, the method 1300 may include the process intercepting unit preventing the connection. For example, the connection may be dropped or blocked.

Various potential advantages of implementations will now be discussed.

Implementations may include hybrid deployment and assessment, where details of a process are retrieved locally from each device and sent to a central engine for assessment. This distributed nature may enhance load balancing and lead to increased productivity in a network, where network performance is not compromised.

Implementations may define an alert as a process malfunctioning rather than host malfunctioning. Implementations may thus quarantine a vulnerable process rather than a host.

Implementations may not rely on any pre-defined pattern matching policy, nor do implementations generally define a static list of applications installed on a host. Rather, whenever a process initiates a connection from a host, at run-time the implementations may extract the process information. This dynamic nature of information retrieval may provide precise details of an attack and attacker.

The use of alerts stored in an alert store database or the like may provide information about vulnerability of a process with its name and version. This information may be used by a network administrator for taking preventive measures thereby making prevention more effective.

Implementations may reduce the number of false positives from the set of alerts sent by the intrusion prevention unit to the pattern matching unit. Implementations may thus provide a considerable reduction in the false positive rate.

Because details of the vulnerable process may be stored in an alert store database or the like, implementations can provide remediation of the unhealthy processes by applying patches or hot fixes.

Implementations may improve network performance and minimize the efforts of a network administrator.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system for network access control based on traffic monitoring and vulnerability detection using process related information, the system comprising:
    computer executable code embodied in a non-transitory computer readable medium that, when executing one or more processors provide a plurality of process intercepting units, a pattern matching unit, and an intrusion prevention unit,
    a plurality of devices for receiving at least one connection request from a process running on a host, each of the plurality of devices comprising a process intercepting unit of the plurality of process intercepting units configured for extracting the process related information and forwarding information including one or more of process related information, connection information, and network packet information,
    the pattern matching unit configured for receiving the information from the process intercepting unit and forwarding the information; and
    the intrusion prevention unit configured for receiving the information from the pattern matching unit, the intrusion prevention unit including a processing unit and a database, the database including a plurality of signatures defining a set of rules to detect attacks or intrusive activities on a network that can occur through the process, the plurality of signatures prepared based on information relating to the process, the intrusion prevention unit further configured to verify the information from the pattern matching unit against the plurality of signatures stored in the database to identify and detect a known vulnerability in network activities, establish a verification report based on the known vulnerability, and send the verification report to the pattern matching unit,
    wherein the pattern matching unit is further configured to receive the verification report from the intrusion prevention unit, verify whether the verification report is applicable to the process associated with network packet by matching a first signature identification code in the verification report with a second signature identification code stored in an application process information database, and send an authorization decision to the process intercepting unit regarding allowing continuing or blocking of the connection request from the process running on the host.

2. The system of claim 1 wherein the process related information includes a process name and a process version.

3. The system of claim 1 wherein the each of the plurality of signatures includes a unique signature identification code.

4. The system of claim 1 wherein the first signature identification code in the verification report includes a unique signature identification code.

5. The system of claim 4 wherein the application process information database stores a unique signature identification code, a signature name, an applicable process name, and an applicable process version for each of a plurality of application processes.

6. The system of claim 1 wherein the process intercepting unit of one of the plurality of devices is further configured for disallowing only the process and not the host for communication if the authorization decision indicates a matching of the first signature identification code mentioned in the verification report with the second signature identification code stored in an application process information database.

7. The system of claim 1 wherein the pattern matching unit is deployed in an inline mode.

8. The system of claim 1 wherein the pattern matching unit is deployed in an out of band mode.

9. A method for network access control based on traffic monitoring and vulnerability detection using process related information, the method comprising:
    receiving, by a device, at least one connection request from a process running on a host;
    extracting, by a process intercepting unit of the device, process related information;
    forwarding, by the process intercepting unit to a pattern matching unit, information including one or more of process related information, connection information, and network packet information;
    receiving, by the pattern matching unit, the information from the process intercepting unit and forwarding the to an intrusion prevention unit;
    receiving, by the intrusion prevention unit, the information from the pattern matching unit;
    verifying, by the intrusion prevention unit, the information against a plurality of signatures stored in a database of the intrusion prevention unit to identify and detect a known vulnerability in network activity;
    establishing, by the intrusion prevention unit, a verification report based on verification of the information against the plurality of signatures;
    sending, by the intrusion prevention unit, the verification report to the pattern matching unit;
    receiving, by the pattern matching unit, the verification report from the intrusion prevention unit;
    verifying, by the pattern matching unit, whether the verification report is applicable to the process associated with a network packet by matching a first signature identification code in the verification report with a second signature identification code stored in an application process information database; and
    sending, by the pattern matching unit, an authorization decision to the process intercepting unit regarding continuing or blocking of the connection request from the process running on the host.

10. The method of claim 9 wherein the process related information includes a process name and a process version.

11. The method of claim 9 wherein the one of the plurality of signatures defines a set of rules to detect attacks or intrusive activities on a network that can occur through the process, and wherein the one of the plurality of signatures is prepared based on information relating to the process.

12. The method of claim 11 wherein each of the plurality of signatures includes a unique signature identification code.

13. The method of claim 12 wherein the first signature identification code in the verification report includes a unique signature identification code.

14. The method of claim 12 wherein the application process information database contains a unique signature identification code, a signature name, an applicable process name, and an applicable process version for each of a plurality of application processes.

15. The method of claim 14 further comprising disallowance, by the process intercepting unit, of the process and not the host for communication, if an authorization decision indicates matching of the first signature identification code mentioned in the verification report with the second signature identification code stored in the application process information database.

16. The method of claim 9 wherein the pattern matching unit is deployed in an inline mode.

17. The method of claim 9 wherein the pattern matching unit is deployed in an out of band mode.

* * * * *